US012776220B2

(12) United States Patent
Agyekum et al.

(10) Patent No.: US 12,776,220 B2
(45) Date of Patent: Oct. 27, 2026

(54) FLIGHT MANAGEMENT METHOD AND SYSTEM USING SAME

(71) Applicant: Skytrac Systems Ltd., Kelowna (CA)

(72) Inventors: Bernard Agyekum, Ottawa (CA); Jian Zhong Hu, Nepean (CA); Alan Gillis, Calabogie (CA); David Balcaen, Gatineau (CA); Markus Hammer, Almonte (CA); Philip Wyatt, Manotick (CA)

(73) Assignee: Skytrac Systems Ltd. (CA)

( * ) Notice: Subject to any disclaimer, the term of this patent is extended or adjusted under 35 U.S.C. 154(b) by 19 days.

(21) Appl. No.: 18/928,340

(22) Filed: Oct. 28, 2024

(65) Prior Publication Data

US 2025/0054397 A1 Feb. 13, 2025

Related U.S. Application Data

(63) Continuation of application No. 17/724,594, filed on Apr. 20, 2022, now Pat. No. 12,165,528.
(Continued)

(51) Int. Cl.
*G08G 5/30* (2025.01)
*G08G 5/21* (2025.01)
(Continued)

(52) U.S. Cl.
CPC ................. *G08G 5/30* (2025.01); *G08G 5/21* (2025.01); *G08G 5/55* (2025.01); *G08G 5/56* (2025.01);
(Continued)

(58) Field of Classification Search
CPC .. G08G 5/30; G08G 5/21; G08G 5/55; G08G 5/56; G08G 5/59; G08G 5/76; G08G 5/80; G08G 5/32
See application file for complete search history.

(56) References Cited

U.S. PATENT DOCUMENTS 6,753,784 B1 6/2004 Sznaider et al.
6,865,452 B2 3/2005 Burdon
(Continued)

FOREIGN PATENT DOCUMENTS

WO 2018155700 A1 8/2018

OTHER PUBLICATIONS

"Analyzing threats to 3D path lines and corridors using ArcGIS 3D Analyst extension" https://desktop.arcgis.com/en/arcmap/latest/extensions/3d-analyst/analyzing-threats-to-3d-flight-paths-and-corridors.htm downloaded from Wayback Machine Jul. 28, 2019 (Year: 2019).*

(Continued)

*Primary Examiner* — Kito R Robinson
*Assistant Examiner* — Tanya C Sienko
(74) *Attorney, Agent, or Firm* — Price Heneveld LLP

(57) ABSTRACT

Described are various embodiments of a flight management method and system using same. In one embodiment, a digital flight management system comprises: a digital processing environment comprising instructions to access: flight request data related to a flight plan; aircraft parameter data; a flight risk data source; and geographical data. The instructions are executable to: calculate a predicted flight path; digitally compare the predicted flight path with flight risk data from the flight risk data source to assess a flight risk associated with the predicted flight path; and display via a user interface the predicted flight path in accordance with the flight risk.

21 Claims, 20 Drawing Sheets

Related U.S. Application Data

(60) Provisional application No. 63/276,340, filed on Nov. 5, 2021, provisional application No. 63/177,357, filed on Apr. 20, 2021.

(51) Int. Cl.

| | |
|---|---|
| ***G08G 5/55*** | (2025.01) |
| ***G08G 5/56*** | (2025.01) |
| ***G08G 5/59*** | (2025.01) |
| ***G08G 5/76*** | (2025.01) |
| ***G08G 5/80*** | (2025.01) |

(52) U.S. Cl.

CPC ................. *G08G 5/59* (2025.01); *G08G 5/76* (2025.01); *G08G 5/80* (2025.01)

(56) References Cited

U.S. PATENT DOCUMENTS

| | | | | |
|---|---|---|---|---|
| 6,940,426 | B1 * | 9/2005 | Vaida | G08G 5/26 340/963 |
| 7,602,285 | B2 | 10/2009 | Sznaider et al. | |
| 8,610,566 | B2 | 12/2013 | Sznaider et al. | |
| 9,558,672 | B2 | 1/2017 | McCann et al. | |
| 9,607,520 | B2 | 3/2017 | McCann et al. | |
| 10,647,443 | B2 | 5/2020 | Rangan et al. | |
| 11,308,813 | B2 | 4/2022 | Raabe et al. | |
| 2014/0136027 | A1 * | 5/2014 | Mere | G05D 1/0083 701/3 |
| 2020/0074867 | A1 * | 3/2020 | Lefez | G08G 5/21 |
| 2021/0005091 | A1 * | 1/2021 | Raabe | G08G 5/76 |
| 2021/0358310 | A1 * | 11/2021 | Sachs | G08G 5/22 |
| 2022/0139233 | A1 * | 5/2022 | Schwindt | G08G 5/50 701/3 |
| 2022/0204180 | A1 * | 6/2022 | Sellmann | G01C 23/005 |

OTHER PUBLICATIONS

"Flight Management System Pathfinding Algorithm for Automatic Vertical Trajectory Generation" by R. Altava, et al. . DASC 2018, 37th AIAA/IEEE Digital Avionics Systems Conference, Sep. 2018 (Year: 2018).*

Section 3 of FAA 7110.65AA titled "Overdue Aircraft" from The Wayback Machine Mar. 19, 2021 https://www.faa.gov/air_traffic/publications/atpubs/atc_html/chap10_section_3.html (Year: 2021) (Year: 2021).*

"A walkthrough of basic flight planning with LittleNavMap", YouTube video by Jonathan Beckett, 33.25 minutes, Sep. 18, 2020. https://youtu.be/lXfoFwGRduQ?si=eSPfSXpzQ5pTad82 snapshot taken at 21.15 (Year: 2020) (Year: 2020).*

DTN, Safety, efficiency, and mission-critical confidence at your fingertips, AviationSentry Helicopter Edition, 2020.

DTN, The info you need when others need you, Metro Aviation, Inc., 2019, Shreveport, Louisiana.

DTN, Improve your bottom line while keeping your pilot safe, RotorWatch, 2019.

"A walkthrough of basic flight planning with LittleNavMap", YouTube video by Jonathan Beckett, 33.25 minutes, Sep. 18, 2020. https://youtu.be/lXfoFwGRduQ?si=eSPfSXpzQ5pTad82 snapshot taken at 21.15 (Year: 2020).

"Analyzing threats to 3D flight paths and corridors" from The Wayback Machine Sep. 7, 2019, originally from https://desktop.arcg is. co mien/ arc map/latest/extensi ons/3d-anal yst/anal yzi ng-th reats-to-3d-fl i g ht-paths-and-corridors. htm (Year: 2019).

Section 3 of FAA 7110.65AA titled "Overdue Aircraft" from The Wayback Machine Mar. 19, 2021 https://www.faa.gov/air_traffic/publications/atpubs/atc_html/chap1 0_section_3.html (Year: 2021).

* cited by examiner

600

FLIGHT MANAGEMENT METHOD AND SYSTEM USING SAME

CROSS-REFERENCE TO RELATED APPLICATIONS

This application is a continuation of U.S. patent application Ser. No. 17/724,594 filed Apr. 20, 2022, now U.S. Pat. No. 12,165,528, which claims priority under 35 U.S.C. § 119 (e) to U.S. Provisional Application No. 63/177,357 filed Apr. 20, 2021, and U.S. Provisional Application No. 63/276,340 filed Nov. 5, 2021, the disclosures of which are hereby incorporated by reference in their entirety.

FIELD OF THE DISCLOSURE

The present disclosure relates to risk assessment for aviation, and, in particular, to a flight management method and system using same.

BACKGROUND

Various digital platforms exist for assessing a flight plan upon request in view of weather data. However, it remains a challenge to assess flight risks when an aircraft is in flight, and more so to assess flight risks in an automated fashion.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a flight management method and system using same that overcomes some of the drawbacks of known techniques, or at least, provides a useful alternative thereto. Some aspects of this disclosure provide examples of such systems and methods.

In accordance with one aspect, there is provided a digital flight management system comprising: a digital processing environment comprising computer-executable instructions to access flight request data related to a flight plan, aircraft parameter data related to an aircraft associated with the flight plan, a flight risk data source, and geographical data corresponding to a geographical area associated with the flight plan; wherein the digital processing environment further comprises computer-executable instructions to calculate a predicted flight path based at least in part on the flight request data and the geographical data; digitally compare, based at least in part on the aircraft parameter data, the predicted flight path with flight risk data from the flight risk data source to assess a flight risk associated with the predicted flight path; and display via a user interface the predicted flight path in accordance with the flight risk.

In one embodiment, the predicted flight path comprises multiple consecutive predicted flight path segments automatically calculated by the digital processing environment based at least in part on the flight request data and the geographical data, and wherein the digital processing environment is operable to digitally compare each of the predicted flight path segments with flight risk data from the flight risk data source to assess a respective flight risk associated with each of the predicted flight path segments, and display via the user interface the predicted flight path segments in accordance with the respective flight risk.

In one embodiment, the predicted flight path comprises at least an outbound and a return flight path, each one of which comprising respective multiple flight path segments.

In one embodiment, the digital processing environment is operable to execute the computer-executable instructions prior to takeoff of the aircraft.

In one embodiment, the digital processing environment is operable in-flight to digitally compare the predicted flight path with the flight risk data from the flight risk data source in real-time to update the flight risk associated with the predicted flight path in-flight; and display via the user interface the predicted flight path in accordance with the updated flight risk.

In one embodiment, the flight risk data source comprises a weather data source.

In one embodiment, the flight risk data source comprises a flight alert application programming interface (API).

In one embodiment, the digital instructions further comprise instructions to provide an alert associated with the flight path via the user interface.

In one embodiment, the flight risk is displayed via the user interface as an indicium associated with the predicted flight path.

In one embodiment, the aircraft comprises a plurality of respective aircrafts, and wherein the digital processing environment is operable to execute the network-executable instructions and the digital instructions for each of the plurality of respective aircrafts.

In one embodiment, the user interface is user-configurable to display designated graphical layers associated with one or more of the predicted flight path, the flight risk data, the geographical data, or the aircraft parameter data.

In one embodiment, the computer-executable instructions further comprise instructions to access aircraft location data, and calculate a flight deviation value based on the aircraft location data and the predicted flight path, and calculate an updated flight path based at least in part on the aircraft position data, the geographical data, and the flight plan.

In one embodiment, the instructions further comprise instructions to digitally compare, based at least in part on the aircraft parameter data, the updated flight path with flight risk data from the flight risk data source to assess a real-time flight risk associated with the updated flight path, and display via the user interface the updated flight path in accordance with the real-time flight risk.

In one embodiment, the digital instructions further comprise instructions to provide an alert related to an overdue aircraft based at least in part on the flight plan.

In one embodiment, the predicted flight path comprises an airspace volume, and wherein the flight path is compared with the flight risk data associated with locations defined within the airspace volume.

In one embodiment, the airspace volume comprises a take-off column associated with an area around a take-off location, a landing column associated with an area around a planned landing location, and a flight path corridor defined around a planned flight altitude along the flight plan.

In one embodiment, the take-off column and the landing column are substantially vertically oriented airspace columns, whereas the flight path corridor is a substantially horizontally oriented airspace corridor.

In one embodiment, each of the flight path segments comprises a corresponding airspace volume, and wherein each of the flight path segments is compared with the flight risk data associated with locations defined within the corresponding airspace volume.

In one embodiment, the flight risk data source comprises a Notice to Airman (NOTAM) feed reporting multiple NOTAM risks; wherein said digital processing environment further comprises computer-executable instructions to: rank said multiple NOTAM risks as a function of said predicted flight path and a user-input ranking bias to be applied in ranking said multiple NOTAM risks; digitally compare said predicted flight path with flight risk data from said flight risk data source, including a highest ranking subset of said NOTAM risks given said user-input ranking bias, to assess said flight risk associated with said predicted flight path.

In one embodiment, the user-input ranking bias is selectable from a predefined set of designated biases, and wherein said user-input ranking bias is set as a function of said flight request data including a requested or predicted flight path altitude.

In accordance with another embodiment, there is provided a digital flight management system comprising: a digital processing environment having computer-executable instructions to access flight request data related to a flight plan, aircraft parameter data related to an aircraft associated with the flight plan, a flight risk data source, and geographical data corresponding to a geographical area associated with the flight plan; wherein the digital processing environment is further operable to calculate a predicted flight path comprising multiple consecutive predicted flight path segments based at least in part on the flight request data, the geographical data, and the aircraft parameter data, digitally compare, based at least in part on the aircraft parameter data, each of the predicted flight path segments with flight risk data from the flight risk data source to assess a respective flight risk associated with each of the predicted flight path segments, and display via a user interface the predicted flight path segments in accordance with the respective flight risk.

In accordance with another aspect, there is provided a digital flight management system for monitoring an in-flight aircraft, the system comprising: a digital processing environment having computer-executable instructions to access flight plan data associated with the in-flight aircraft, aircraft parameter data related to the in-flight aircraft, aircraft location data, a flight risk data source, and geographical data corresponding to a geographical area associated with the flight plan data; wherein the digital processing environment is further operable to calculate a predicted flight path based at least in part on the flight plan data, the aircraft location data, and the geographical data, digitally compare, based at least in part on the aircraft parameter data, the predicted flight path with flight risk data from the flight risk data source to assess a flight risk associated with the predicted flight path, and display via a user interface the predicted flight path in accordance with the flight risk; and wherein the flight risk is updated in real-time in flight and the display of the predicted flight path is updated according to the updated flight risk.

In accordance with another aspect, there is provided a digital flight management system for monitoring an in-flight aircraft, the system comprising: a digital processing environment having computer-executable instructions to access predicted flight path data associated with the in-flight aircraft and a flight plan, aircraft parameter data related to the in-flight aircraft and comprising a flight deviation threshold, aircraft location data, a flight risk data source, and geographical data corresponding to a geographical area associated with the flight plan; wherein the digital processing environment is further operable to calculate a flight deviation value based on the aircraft location data and the predicted flight path data, and upon the flight path deviation value exceeding a deviation threshold value, calculate an updated flight path based at least in part on the aircraft position data, the geographical data, and the flight plan, digitally compare, based at least in part on the aircraft parameter data, the updated flight path with flight risk data from the flight risk data source to assess a flight risk associated with the updated flight path, and display via a user interface the updated flight path in accordance with the flight risk.

In accordance with one aspect, there is provided a computer-readable medium comprising digital instructions for execution by a digital data processor to implement one or more of the above-noted embodiments.

In accordance with another aspect, there is provided a computer-implemented digital flight management method comprising: digitally accessing: flight request data related to a flight plan; aircraft parameter data related to an aircraft associated with said flight plan; a flight risk data source; and geographical data corresponding to a geographical area associated with said flight plan; calculating a predicted flight path based at least in part on said flight request data and said geographical data; digitally comparing, based at least in part on said aircraft parameter data, said predicted flight path with flight risk data from said flight risk data source to assess a flight risk associated with said predicted flight path; and displaying via a user interface said predicted flight path in accordance with said flight risk.

In accordance with another aspect, there is provided a computer-implemented digital flight management method comprising: accessing: flight request data related to a flight plan; aircraft parameter data related to an aircraft associated with said flight plan; a flight risk data source; and geographical data corresponding to a geographical area associated with said flight plan; calculating a predicted flight path comprising multiple consecutive predicted flight path segments based at least in part on said flight request data, said geographical data, and said aircraft parameter data; digitally comparing, based at least in part on said aircraft parameter data, each of said predicted flight path segments with flight risk data from said flight risk data source to assess a respective flight risk associated with each of said predicted flight path segments; and displaying via a user interface said predicted flight path segments in accordance with said respective flight risk.

In accordance with another aspect, there is provided a computer-implemented digital flight management method comprising: accessing: flight plan data associated with the in-flight aircraft; aircraft parameter data related to the in-flight aircraft; aircraft location data; a flight risk data source; and geographical data corresponding to a geographical area associated with said flight plan data; calculating a predicted flight path based at least in part on said flight plan data, said aircraft location data, and said geographical data; digitally comparing, based at least in part on said aircraft parameter data, said predicted flight path with flight risk data from said flight risk data source to assess a flight risk associated with said predicted flight path; and displaying via a user interface said predicted flight path in accordance with said flight risk; wherein said flight risk is updated in real-time in flight and said display of said predicted flight path is updated according to said updated flight risk.

In accordance with another aspect, there is provided a computer-implemented digital flight management method comprising: accessing: predicted flight path data associated with the in-flight aircraft and a flight plan; aircraft parameter data related to the in-flight aircraft and comprising a flight deviation threshold; aircraft location data; a flight risk data source; and geographical data corresponding to a geographical area associated with said flight plan; calculating a flight deviation value based on said aircraft location data and said predicted flight path data, and upon said flight path deviation value exceeding a deviation threshold value, calculate an updated flight path based at least in part on said aircraft position data, said geographical data, and said flight plan; digitally comparing, based at least in part on said aircraft parameter data, said updated flight path with flight risk data from said flight risk data source to assess a flight risk associated with said updated flight path; and displaying via a user interface said updated flight path in accordance with said flight risk.

In accordance with another aspect, here is provided a digital flight management system comprising: a digital processing environment comprising computer-executable instructions to access: flight request data related to a flight plan; aircraft parameter data related to an aircraft associated with said flight plan; a flight risk data source comprising a Notice to Airman (NOTAM) feed reporting multiple NOTAM risks; and geographical data corresponding to a geographical area associated with said flight plan; wherein said digital processing environment further comprises computer-executable instructions to: calculate a predicted flight path based at least in part on said flight request data and said geographical data; rank said multiple NOTAM risks as a function of said predicted flight path and a user-input ranking bias to be applied in ranking said multiple NOTAM risks; digitally compare, based at least in part on said aircraft parameter data, said predicted flight path with flight risk data from said flight risk data source, including a highest ranking subset of said NOTAM risks given said user-input ranking bias, to assess a flight risk associated with said predicted flight path; and display via a user interface said predicted path in accordance with said flight risk, comprising risk identification associated at least in part with said highest ranking subset of said NOTAM risks.

In one embodiment, the user-input ranking bias is selectable from a predefined set of designated biases.

In one embodiment, the user-input ranking bias is set as a function of said flight request data including a requested or predicted flight path altitude.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1A:
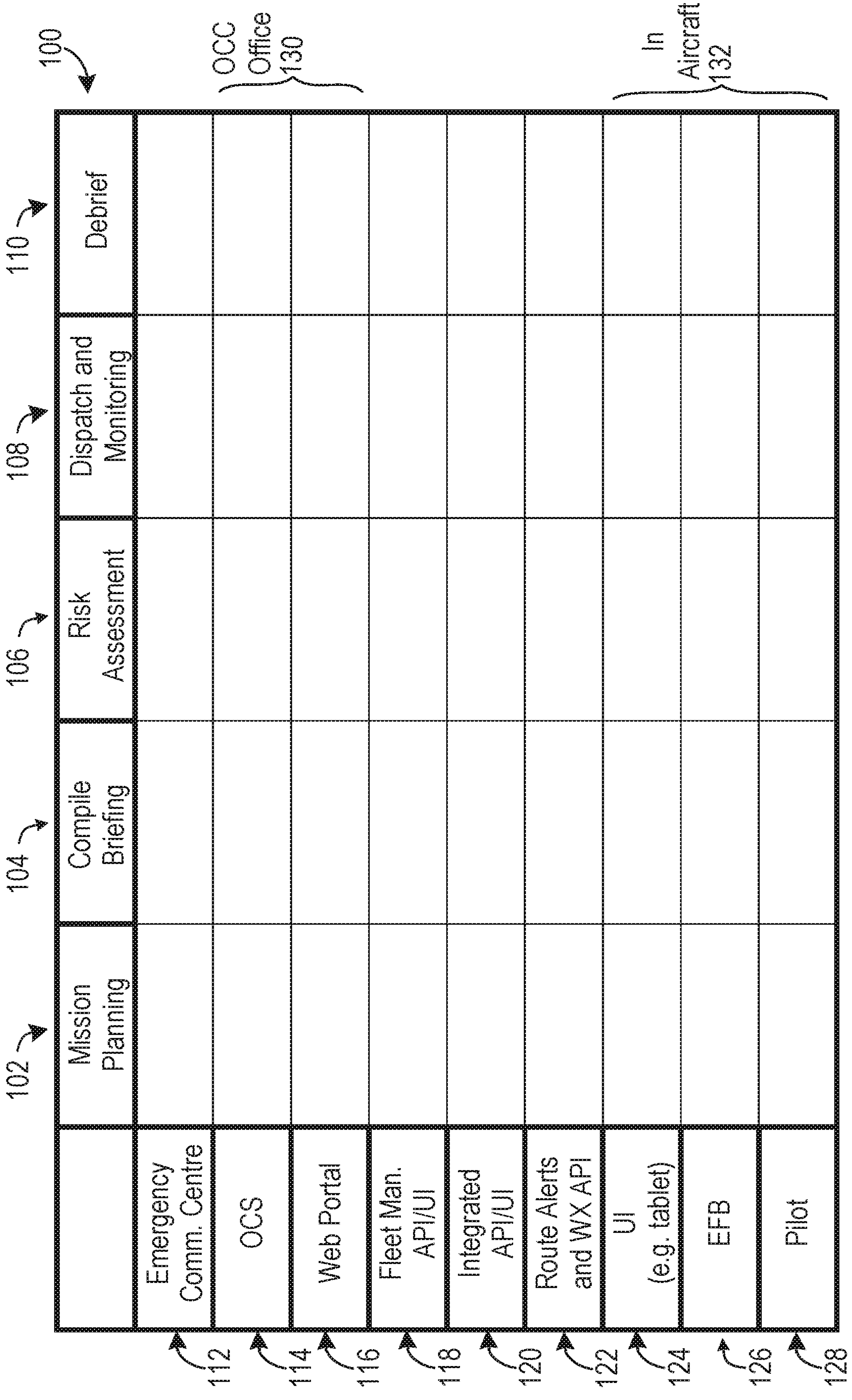
FIGS. 1A to 1F are diagrams illustrating an exemplary flight management process, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

While assessment of current and predicted weather conditions is ubiquitous in aircraft flight planning, making a go/no-go decision for even a single aircraft takeoff requires considerable time in multi-variable analysis of up-to-date weather data at a number of points of interest, including both a takeoff and landing point, as well as intervening space along an expected flight route. Depending on the nature of the flight, such as decision-making may further require several tiers of approval, from a pilot in command (PIC) to a fleet operator. For applications such helicopter ambulance operations, the amount of time required to make such decisions can be the difference between life and death.

Further, weather conditions along a flight route are subject to change in the time between when a go/no-go decision is made and when the aircraft lands safely. Accordingly, real-time flight plan monitoring with respect to evolving weather conditions is paramount in ensuring aircraft safety. However, monitoring even a single aircraft in view of real-time and evolving weather conditions is challenging, even for digital platforms dedicated to monitoring a single aircraft. The challenge is of course greater for systems aimed towards monitoring several aircraft simultaneously.

For example, various jurisdictions require that private aircraft fleet operators providing commercial non-scheduled aircraft operations, as well as certificate holders authorised to conduct helicopter air ambulance (HAA) operations, have an Operational Control Center (OCC) if they operate ten or more aircraft or HAAs. Each operator's aircraft tracking system must provide adequate control of an operation being conducted, requiring that the operator restrict or suspend operations when either the PIC or the operator becomes aware of a hazardous condition. One acceptable operational compliance measure is the use of a formal release system including filed flight plans. The operator's protocol must prohibit the PIC from operating without an activated flight plan until arrival at the destination airport. For most operators, this is typically achieved by manually following a flight plan in view of aircraft location(s) and a current weather forecast, wherein a judgement decision is constantly being made as to whether or not a communications specialist needs to reroute or ground an aircraft, often by manually comparing an aircraft course with a registered flight plan. While various aspects of this decision-making may be assisted by a digital platform or computer system (e.g. a GIS or other mapping system displaying a weather forecast), the process is typically segregated between distinct systems aimed towards assisting an operator (or, in other applications, a pilot) in making decisions through the display of potentially pertinent but independent streams of information.

Similarly, even in more advanced digital systems of flight plan assessment, various aspects of a flight plan (e.g. route planning, go/no-go decision-making, in-flight monitoring, etc.) are typically addressed by independent platforms. For instance, various digital and networked systems are configured to access and process weather data to assist in deciding a flight route based on input flight parameters. One such example is disclosed in U.S. Pat. No. 9,558,672 issued to McCann et al. on Jan. 31, 2017 and entitled "Dynamic Aircraft Threat Controller Manager Apparatuses, Methods and Systems", wherein a digital platform receives takeoff and landing information for an anticipated flight to generate a flight path in view of icing and turbulence predictions based on anticipated weather and the aircraft airfoil type. Similarly, U.S. Pat. No. 9,607,520 issued to McCann et al. on Mar. 28, 2017 and entitled "Dynamic Turbulence Engine Controller Apparatuses, Methods and Systems" discloses a system for generating a flight path based on a turbulence forecast.

Various platforms are similarly directed specifically towards in-flight monitoring, with the majority dedicated to monitoring a single aircraft. For instance, U.S. Pat. No. 6,865,452 issued Mar. 8, 2005 to Burton and entitled "Quiet Mode Operation for Cockpit Weather Displays" discloses a cockpit weather system operable to display a weather threat predicted based on the current position, speed, and planned course of the aircraft of which it is onboard.

Monitoring a fleet of aircraft, on the other hand, requires significantly greater processing resources. While such platforms have been contemplated, they are often limited in their functionality. For example, RotorWatch™ is an extension of AviationSentry™ that provides a display for tracking of a fleet of helicopters with a weather overlay. While geared towards real-time monitoring of a fleet to assess weather risks, such systems typically track a limited number of points of interest, such as takeoff and landing locations. Furthermore, such monitoring systems typically rely on the current location, speed, and heading of aircraft to generate alerts to potential hazards, relying on manual observation of weather layers in relation to fleet positions in order to assess risk along the actual path that aircraft will follow.

Furthermore, flight management and/or flight plan assessment generally comprises consideration of variables in addition to conventional weather forecasts, although this aspect alone presents significant challenges with respect to flight monitoring. For instance, flight management may further comprise assessment of flight categories (e.g. instrument flight rules, visual flight rules, or the like), as well as terrain analysis, radar categories and/or reflectivity, temporary flight restrictions, knowledge of other flight routes in or near an airspace, or the like.

A need therefore exists for an aircraft management platform operable to assess the actual route to be taken by an aircraft in view of real-time weather data and forecasts, as well as other potential hazards associated with a flight. Accordingly, the systems and methods described herein provide, in accordance with different embodiments, different examples of a flight plan evaluation system for providing a comprehensive risk assessment with respect to a wide range of potential hazards from, for instance, temporary flight restrictions to lightning storms. In accordance with some embodiments, such a platform may evaluate real-time weather data and forecasts as a pre-flight assessment in consideration of a flight plan. Various embodiments alternatively or additionally relate to monitoring potential weather-related risks during flight of an aircraft in real time in view of up-to-date weather data, as well as ongoing monitoring of potential risks along an anticipated flight route. In accordance with various embodiments, such a platform may further be operable to provide pre-flight flight plan weather checks, in-flight weather checks, and ongoing, real-time weather checks of a flight route for a fleet of aircraft.

In accordance with various embodiments, a flight management platform enables seamless integration between modules for assessing, monitoring, and reporting on a wide range of flight aspects. For example, and without limitation, one embodiment relates to a platform that, upon receipt of a flight request, handles all aspects of planning, monitoring, and reporting of a flight in real time. For example, and in accordance with one embodiment, a flight request may be received by a flight management platform, whereby the platform then handles all aspects of flight planning, tracking and reporting in accordance with jurisdictional or other flight requirements. That is, based on a submitted flight request, the flight management platform may automatically integrate with a fleet management API, or flight risk assessment tool (FRAT), such as CompleteFlight™, to simplify compliance with 14 C.F.R. Part 135 requirements, while also integrating with an integrated flight API (ForeFlight™) and a flight route alerting and weather (WX) API for monitoring, pre-flight and in-flight, various aspects of the flight plan associated with the flight request. Further, various embodiments enable such monitoring via a graphical interface, wherein all aspects of any number of flights or aircraft (e.g. hundreds of aircraft in an emergency response helicopter fleet across a country) may be simultaneously tracked visually, or selectively shown based on a risk assessment or noted alert.

With reference to FIGS. 1A to 1F, and in accordance with one exemplary embodiment, an exemplary mission dispatch process, generally referred to using the numeral 100, will now be described. It will be appreciated that the process 100 may comprise various elements that are optional features that may improve a dispatch process for certain applications, such as an emergency medical services (EMS) dispatch process for a fleet of medical helicopters. Accordingly, various dispatch processes, in accordance with various embodiments, may comprise fewer or additional elements, or process steps performed in different sequences, than is presented in the exemplary embodiment of process 100.

Indeed, for illustrative purposes, the dispatch process 100 is a relatively complex process, and is accordingly described with reference to different aspects of the process 100 in FIGS. 1B to 1F. To this end, FIG. 1A generally presents an overview of the process 100 comprising aspects related to mission planning 102, compiling of a mission briefing 104, risk assessment 106, mission dispatch and monitoring 108, and mission debriefing 110, wherein each aspect is respectively schematically illustrated in FIGS. 1B to 1F.

The elements of the exemplary process 100 are further schematically represented as generally being performed by or at one of various participants or elements, non-limiting examples of which may include an emergency communication center 112, an operations control specialist (OCS) 114, a web portal 116, a fleet management platform or flight risk assessment tool (FRAT) 118, such as the CompleteFlight™ application programming interface (API), or user interface (UI) 118, an integrated flight application API or UI 120 (e.g. ForeFlight™), a route alert and/or weather (WX) API 122, an in-aircraft display or UI such as a tablet 124, an electronic flight bag (EFB) 126, such as a tablet, and an aircraft pilot 128.

To assist the reader, the general schematic structure of the participants or elements of the process 100 shown in FIG. 1A are preserved throughout FIGS. 1B to 1F, with exemplary interconnectivity of various process elements across aspects, participants, or elements indicated in FIGS. 1B to 1F. However, as noted above, it will be appreciated that various embodiments relate to fewer or additional aspects, participants, or elements, depending on the application at hand. For instance, while managing or monitoring a fleet of hundreds of helicopters and associated crew may be improved via a fleet management API 118 or FRAT (e.g. CompleteFlight), making a go/no-go decision for a single private aircraft may not require such an element. Similarly, as the process 100 relates generally to complex fleet management and monitoring, the OCS 114 and web portal 116 may reside in an operations control centre (OCC) 130, while the UI 124, EFB 126, and pilot 128 may generally be associated with an aircraft 132. However, in accordance with other embodiments, a flight request may be provided directly to an aircraft management platform directly by a user via a web portal 116.

Figure 1B:
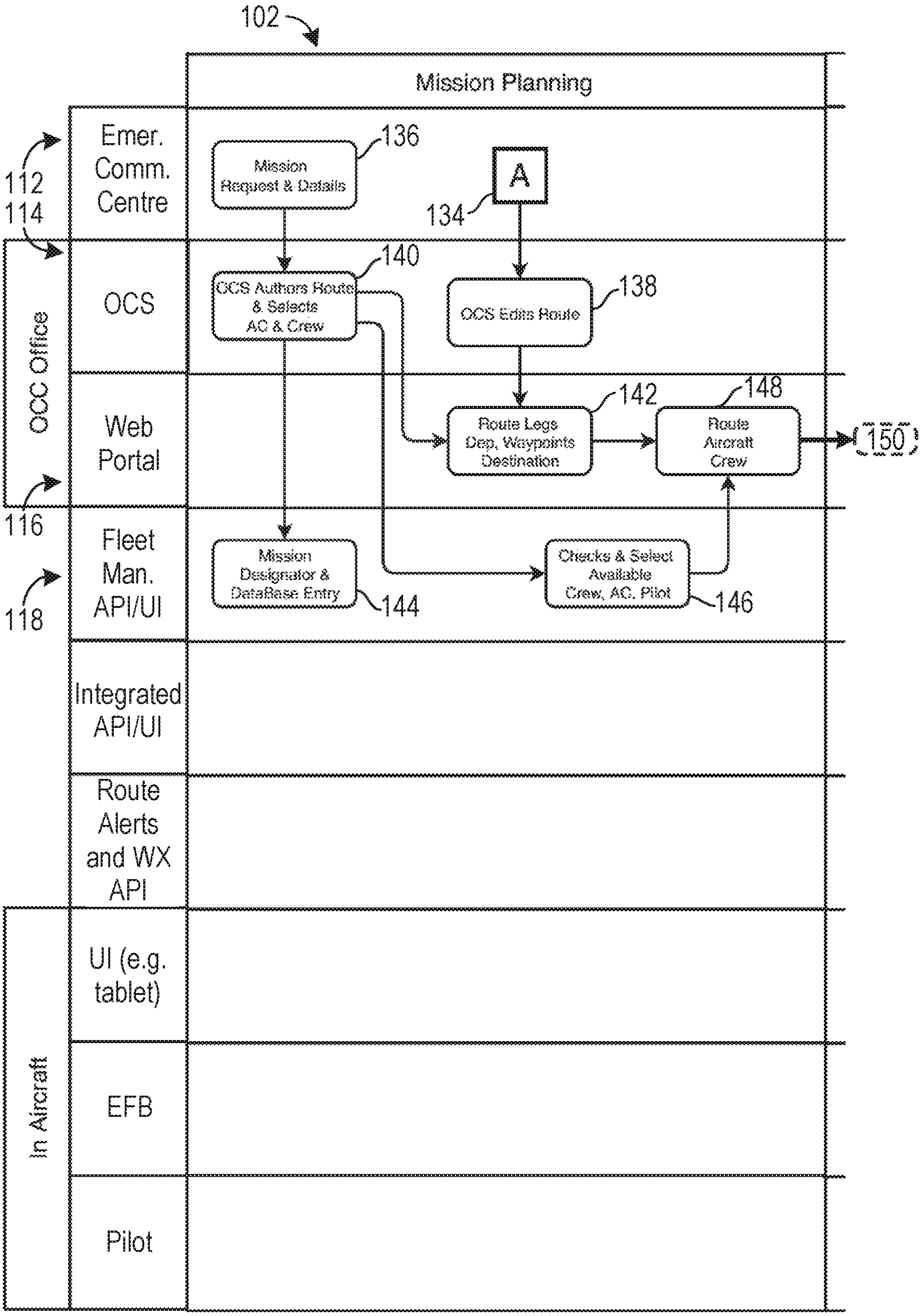

In accordance with one embodiment, FIG. 1B schematically illustrates an exemplary mission planning aspect 102 of the exemplary process 100. In this example, an emergency communications centre (ECC) 112 may submit a proposed flight route A 134 and associated mission details 136 to an OCS 114. The OCS may then edit 138 the proposed route, and/or independently author the route and select 140 an aircraft and crew for the mission, which may be submitted via a web portal 116, and wherein route legs, mission waypoints, or the like, are generated 142 and/or stored 142 for future access. The authored route and associated details 140 may further be registered via a fleet management API/UI 118, or FRAT, such as CompleteFlight, wherein a mission designator and other relevant data may be stored 144 in a database. Similarly, the API 118 may check and/or select 146 available aircraft and/or crew (e.g. verifying whether a crew is sufficiently rested via flight logs, etc.), which, in conjunction with stored route legs and/or waypoint data 142, may be accessed via the web portal 116 to direct 148 or otherwise confirm 148 aircraft crew associated with the proposed flight request.

Figure 1C:
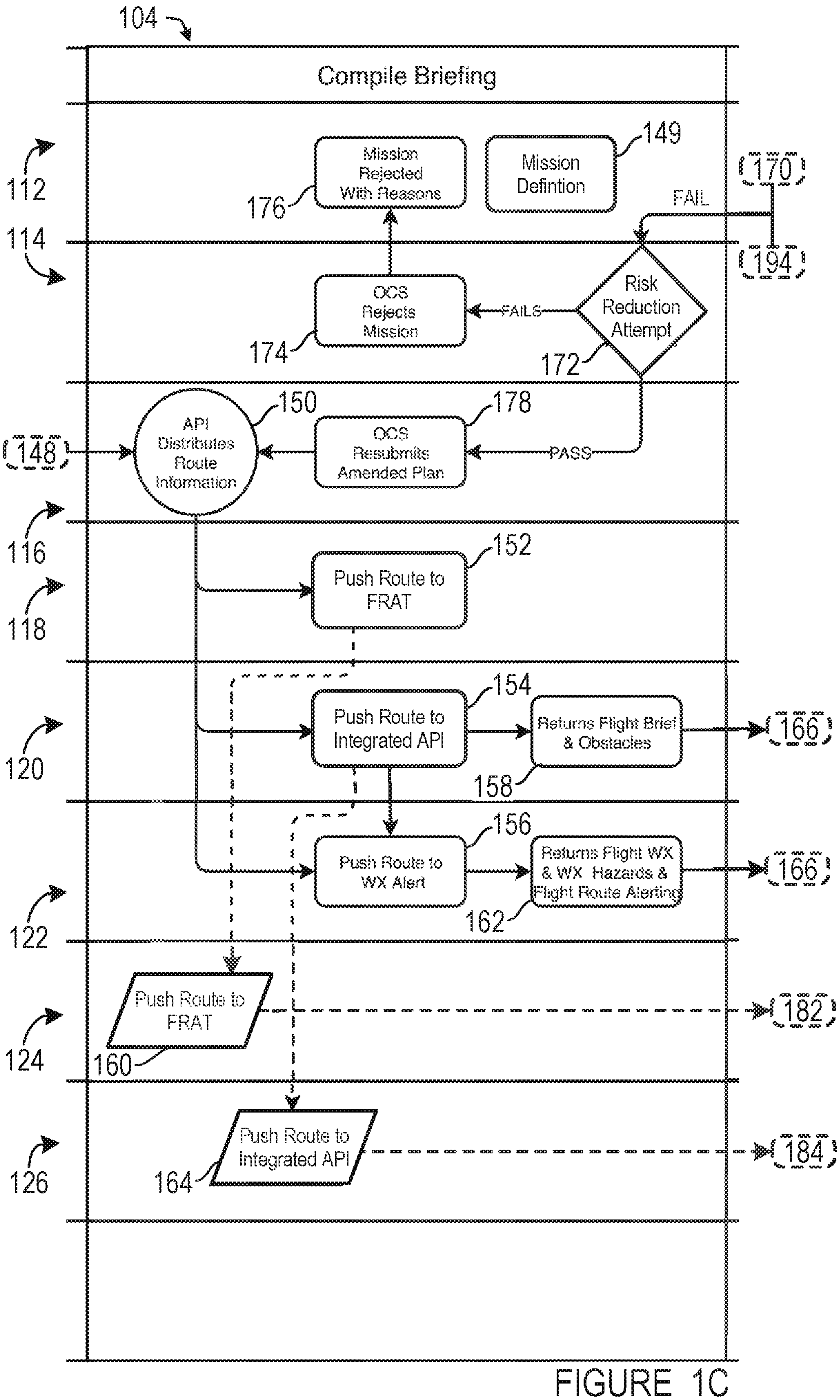
Figure 1D:
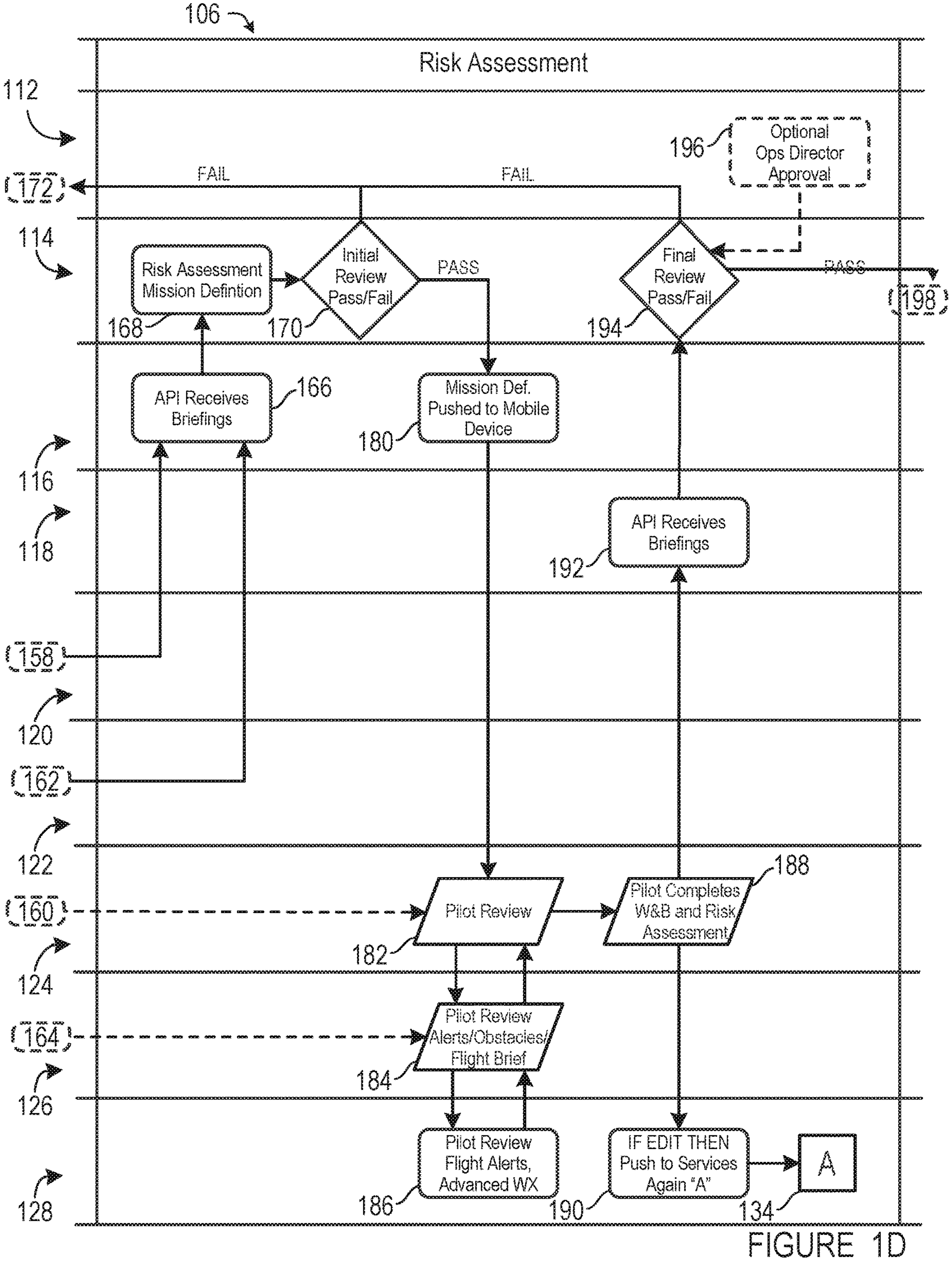

In the exemplary embodiment of FIGS. 1A to 1F, a briefing 104 may then be compiled in view of a mission definition 149, as schematically represented in the diagram of FIG. 1C. In this example, the route and crew data 148 received at the web portal 116 may be distributed 150 as route information via an API. In this exemplary embodiment, distributing 150 the route information comprises pushing route data 152 to the fleet management API 118, or FRAT, such as CompleteFlight, pushing route data 154 to an integrated API 120, such as a ForeFlight API 120, and pushing route data 156 to a route and/or WX alert API 122. In accordance with some embodiments, the integrated flight API 120 may return 158 a flight briefing and/or obstacles associated with the flight, while optionally further pushing route data 160 to an in-aircraft UI 124 or FRAT. Similarly, the route alerting and WX API 122 may return 162 flight WX, WX hazards, and/or flight route alerts, while optionally further pushing route data 164 to an in-aircraft EFB 126. It will be appreciated that an in-aircraft UI 124 may comprise a cockpit display, a computer, or the like, and may comprise the same or different electronic devices.

In the exemplary process 100 of FIGS. 1A to 1F, flight briefings and/or obstacles 158 returned by an integrated flight API 120, and/or flight WX, WX Hazards, and/or flight route alerts 162 returned by a WX alert API 122, may be received 166 via an API at a web portal 116 for access by the OCS 114 for performance of a risk assessment 168 and/or evaluation of a mission definition 168 within a risk assessment aspect 106 of the process 100. Upon an initial review 170, the OCS 114 may deem that a mission should not proceed (e.g. due to a WX risk 162, a flight obstacle 158, or the like), in which case a risk reduction attempt 172 may be performed. Should the risk reduction attempt 172 fail, the OCS 114 may reject 174 the mission, with a mission rejection with reasons 176 provided to the ECC 112 within the briefing aspect 104. Should the risk reduction attempt 172 be successful, the OCS may resubmit an amended plan 178, at which point the process 100 may continue with a redistribution of route information at process step 150.

Figure 1E:
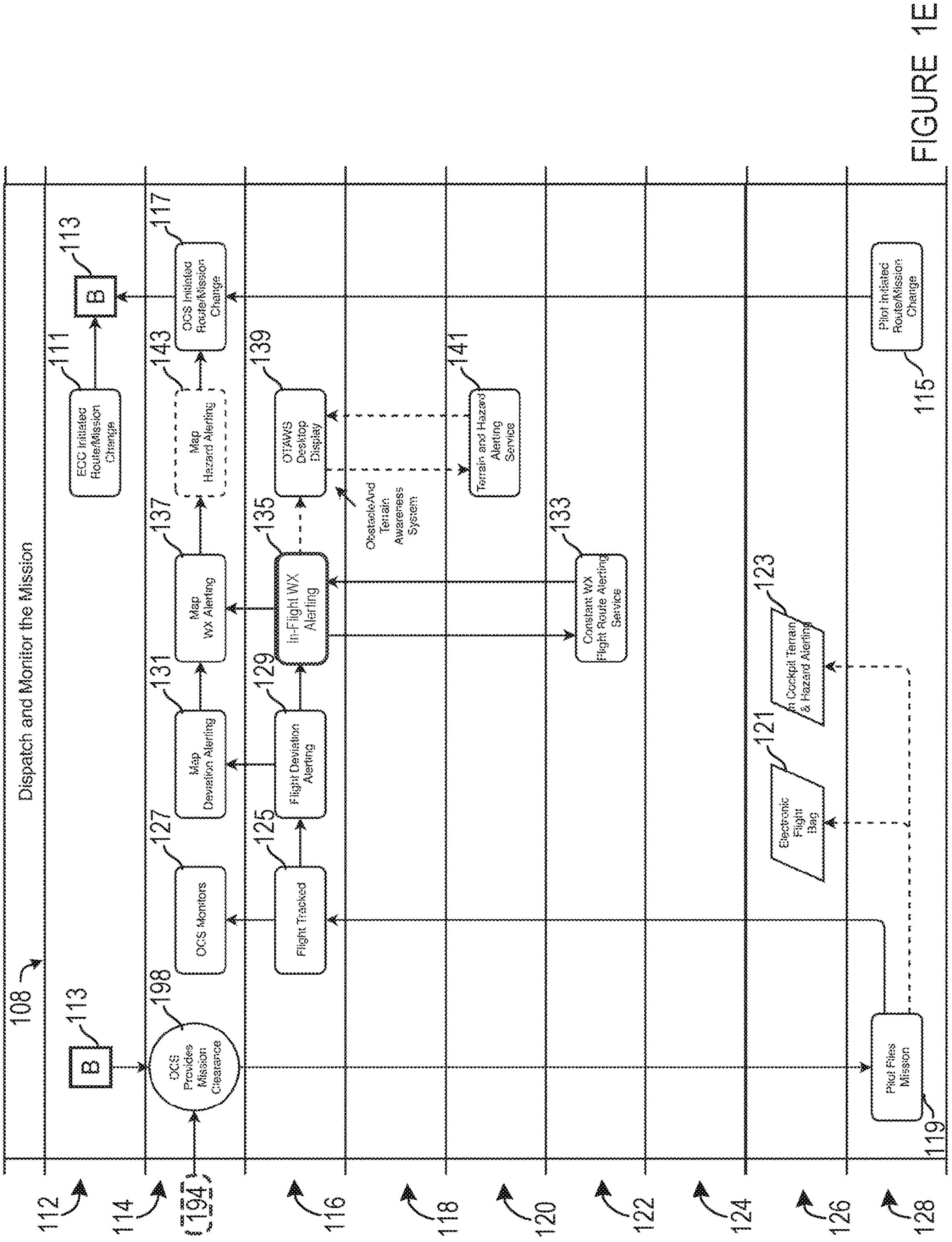

Should the initial review 170 pass, the mission definition may be pushed 180 to an in-aircraft UI 124 for pilot review 182. Similarly, and in accordance with some embodiments, a pilot or crew may optionally also review 184 any alerts, obstacles, or flight briefs, and/or optionally review 186 any additional alerts and/or advanced WX notifications. Upon completion 188 of the pilot review, if any pilot or crew edits may be pushed 188 to services to update the flight plan A 134, wherein the process 100 may proceed or repeat as described above. The process 100 may then further proceed following pilot review by pushing any briefing data 192 to the web portal 116 via an API, wherein the OCS 114 may perform a final review 194, optionally with OPS director approval 196. Should the final review fail, the process may continue with a risk reduction attempt 172, as described above. Should the final review 194 be deemed to pass a risk assessment 106, the process may then continue with OCS providing mission clearance 198 in a dispatch and monitoring aspect 108 of the process 100, as schematically shown in FIG. 1E.

During a mission dispatch and monitoring aspect 108, any ECC initiated route or mission changes 111 may be included in an updated flight plan B 113. Similarly, any pilot-initiated changes 115 and/or OCS-initiated route or mission changes 117 may be included in the updated plan B 113. Any such updates may further be included in OCS-provided mission clearance 108, whereinafter the pilot may conduct the mission 119. During the mission, any updates or flight data may be sent to or recorded by an electronic flight bag 121, wherein any terrain or hazard alerts 123 may be provided in the cockpit.

During the mission, the OCC office 130 may track the flight 125 via a web portal 116, with additional monitoring 127 of the mission by the OCS. Further, any flight deviation alerts 129 may be provided via the web portal, with any deviations displayed to the OCS as alerts 131 on, for instance, a map or other interface. The web portal 116, in communication with a WX and flight route alerting service 133, may further identify any in-flight WX alerts 135 for graphical alerting 137 at the OCS. In-flight WX alerting 135 may further display any alerts via an obstacle and terrain awareness system (OTAWS) display 139, which may further receive and display any alerts from a terrain and hazard alerting service 141. Alerting may further comprise mapping any other identified hazards 143, any alerts of which may be included in any OCS-initiated route or mission changes 117.

Figure 1F:
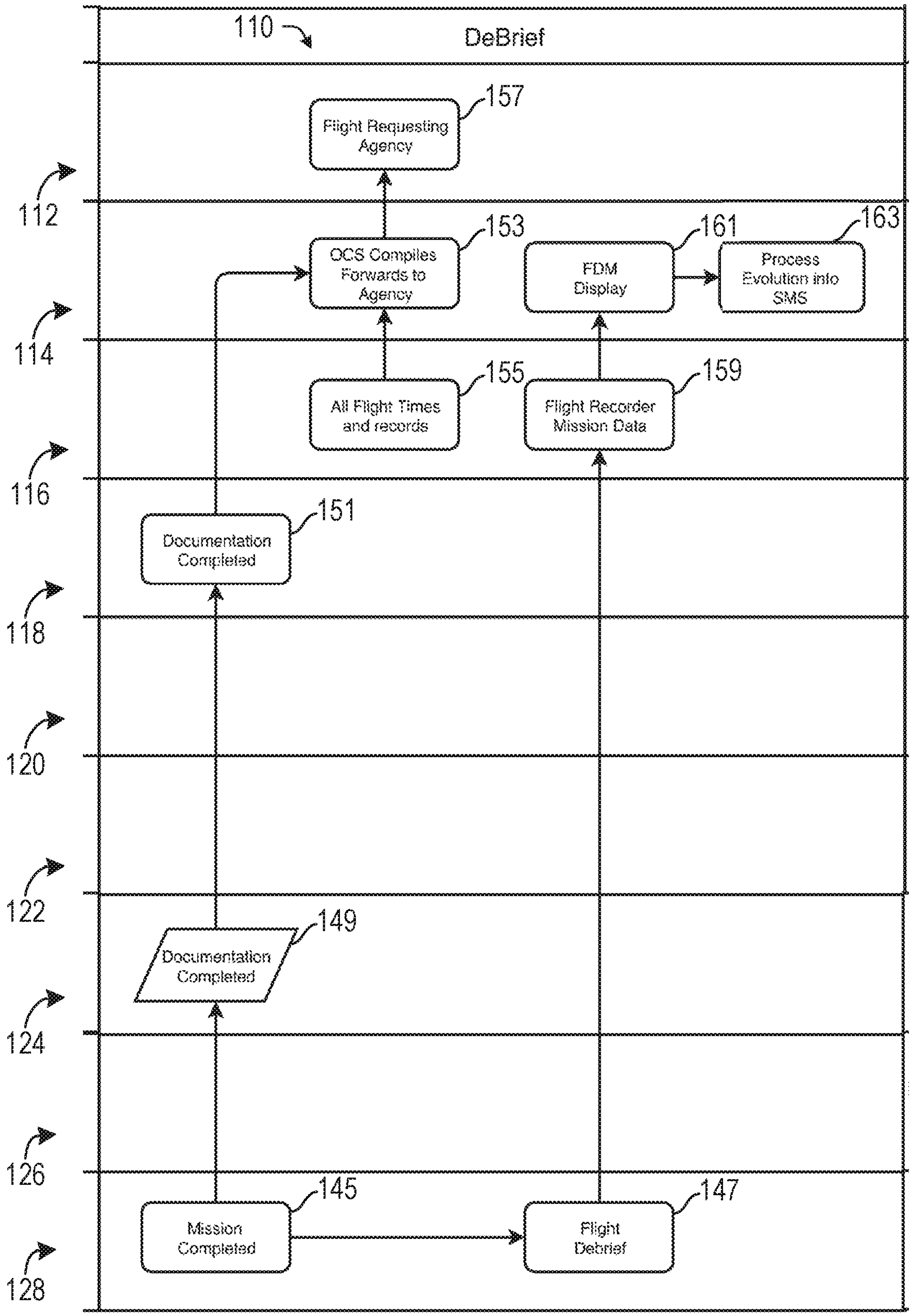

In accordance with some embodiments, the process 100 may further comprise a debrief 110 following mission completion 145, as schematically shown in FIG. 1F. In this example, the pilot may conduct a debrief 147 and submit any documentation 149 via an in-aircraft UI 124. Completed documentation may then be submitted 151 via an API to the OCS for compiling 153 with any flight times and records 155 for forwarding to a flight requesting agency 157. Any pilot debrief 147 may also include any flight recorder mission data 159 for access via the web portal for flight data monitoring (FDM) display 161 and for process evolution into a safety management system (SMS) 163 at the OCS.

In accordance with various embodiments, a flight management platform may comprise a number of integrated modules or aspects for various applications. For example, and in accordance with various embodiments, a flight management platform may comprise weather assessment modules to, for instance, assess a flight request in view of a weather forecast. It will be appreciated that, in accordance with various embodiments, various weather checks may be performed pre-flight, in-flight, and even post flight. For example, a flight request may be initiated via a flight management platform a day in advance of the proposed flight. The flight management platform may then periodically assess the proposed flight route in view of evolving weather predictions before the scheduled flight time, such as every hour up until one hour before the flight. Weather checks may then be performed every five minutes before the scheduled flight time, before continuous or near-continuous monitoring during flight of the aircraft.

Figure 2A:
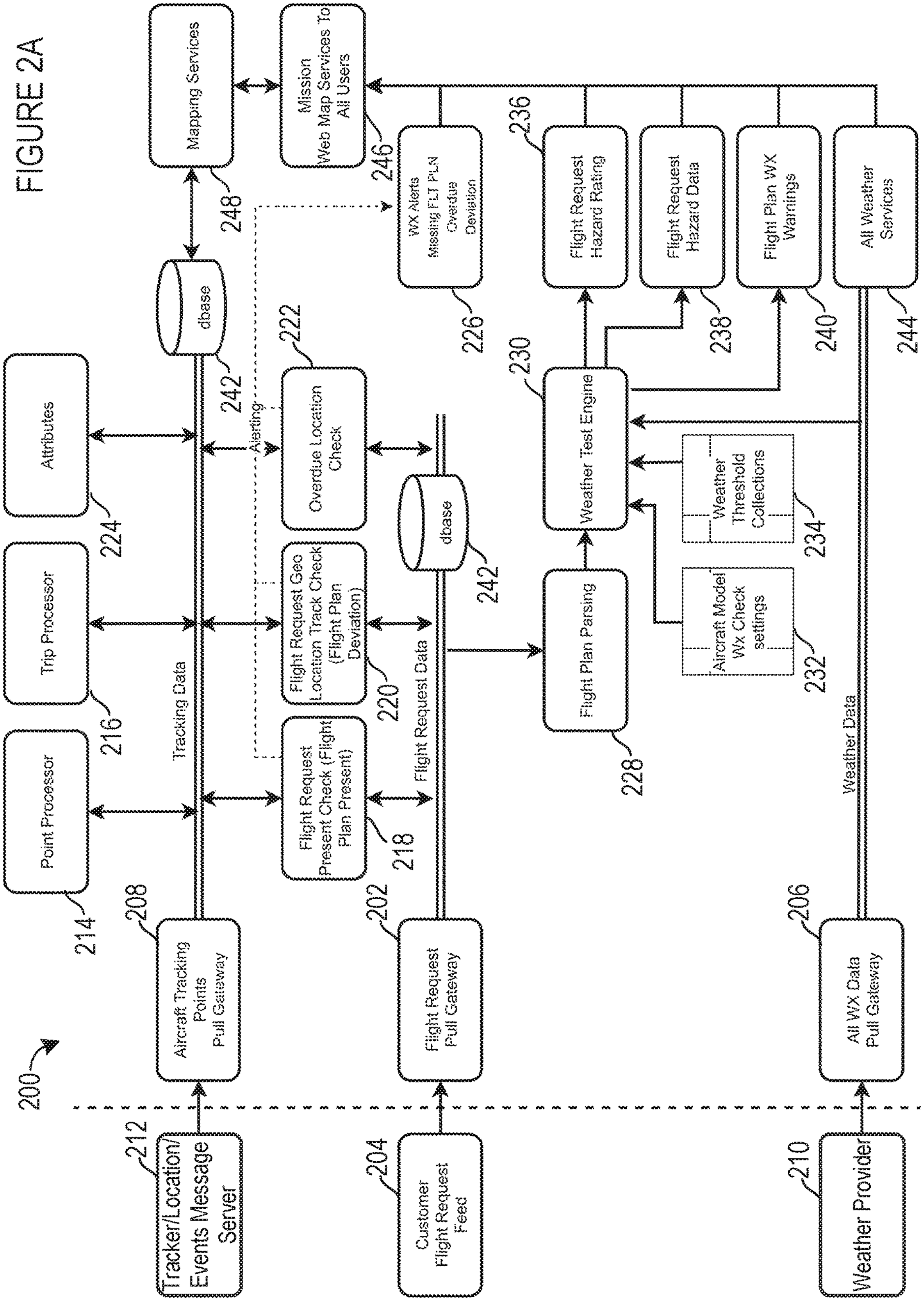
FIGS. 2A and 2B are diagrams of exemplary flight request weather logic flows, in accordance with one embodiment.

In accordance with one embodiment, FIG. 2A is a diagram of an exemplary flight request weather logic 200. In this non-limiting example, a flight management platform may receive a flight request 202 from a customer flight request feed 204. Similarly, it may access weather data 206 and tracking points 208 from respective pull gateways related to, respectively, a weather provider 210 and a tracking, location, and events messaging server 212. The platform, in communication with one or more point processors 214 and trip processors 216, may communicate tracking data and flight request data to perform flight request checks, such as determining that a flight plan is present 218 for a flight, and/or a geolocation check 220, such as one in which it is determined if an aircraft has deviated from the requested flight plan. Similarly, the platform may assess whether a particular flight is overdue 222. Any such checks may establish flight attributes 224 and/or alerts 226.

Similarly, a flight management platform may parse a flight plan 228 based on flight request data 202, which may then be input into a weather test engine 230, which, in conjunction with weather data 206, aircraft model specifications 232 (e.g. input aircraft model parameters, as further discussed below), and weather threshold collections 234, may generate a hazard rating 236, flight request hazard data 238, and/or any flight plan weather warnings 240. In accordance with various embodiments, any or all of such data may be stored in and/or accessed from one or more databases 242. Such data, as well as any alerts 226 and weather service data 244, may be displayed to any or all users of the system via a graphical display 246. For instance, and in accordance with various embodiments, flight routes, aircraft (grounded and/or in-flight), alerts, or the like, may be displayed via a map or similar graphical representation accessible in real time via the internet. Accordingly, and in accordance with various embodiments, a flight management platform may further comprise access to one or more mapping services 248 (e.g. GIS, Google Maps™, or the like) to enable visual display of one or more assets in real time in accordance with their location.

Another aspect of a flight management platform that may improve pilot and/or mission safety is one in which a flight or flights may be monitored as overdue. For instance, an aircraft not arriving at an intended destination by an expected time may be indicative of an accident experienced on route, wherein one or more people may be injured and in immediate need of medical attention. The ability to automatically detect and provide an appropriate alert that an aircraft is not at an expected location, or is overdue following an expected flight route, may result in the timely provision of medical services to save lives.

Figure 2B:
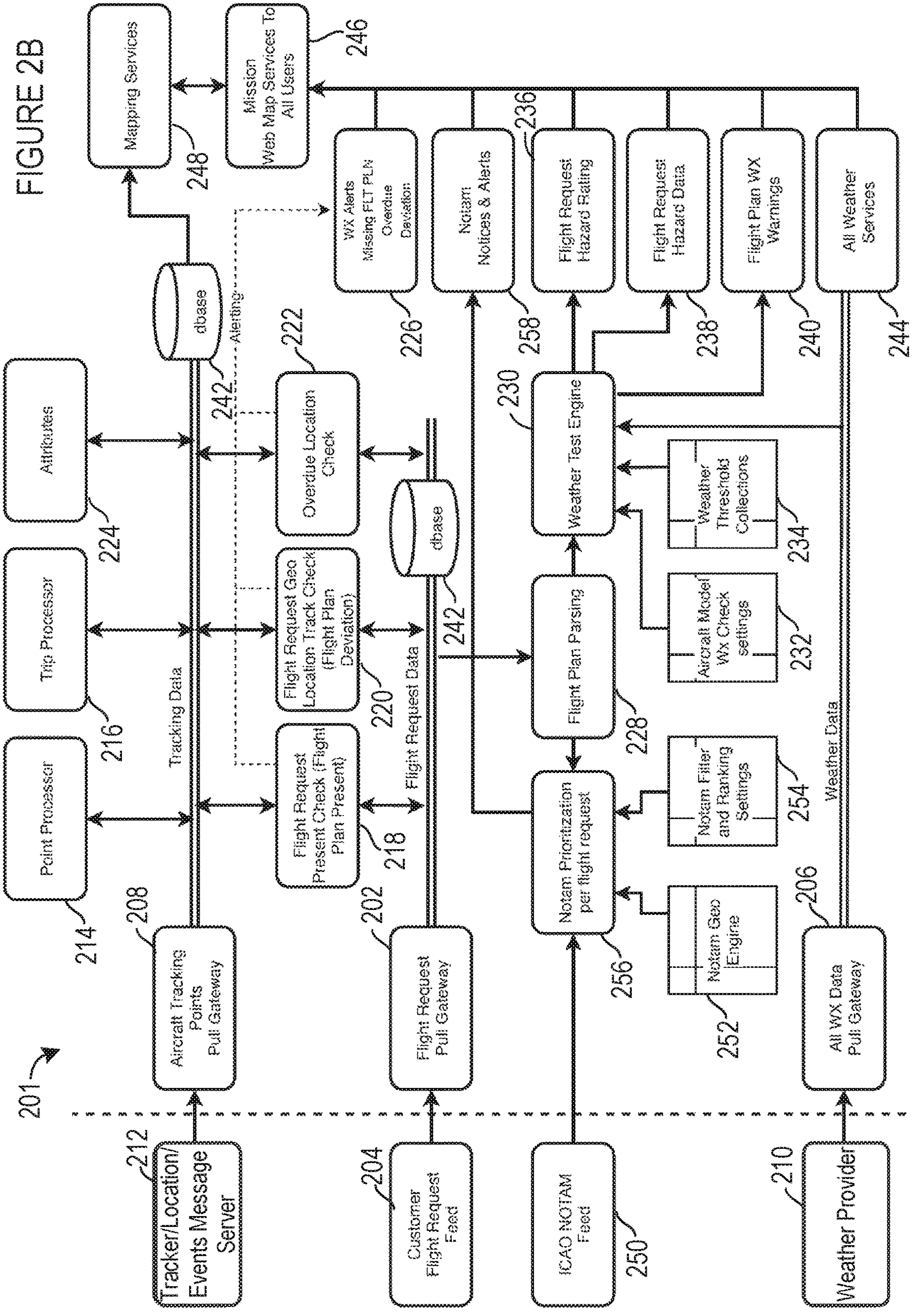

Another aspect of a flight management platform that may improve pilot and/or mission safety and condition of flight awareness is one in which a flight or flights may be monitored for the presence of "notices to airman" (NOTAMs) along or associated with a flight plan (e.g. points of departure and arrival, a proposed flight route and/or segments thereof, or the like). For example, and in accordance with one embodiment, FIG. 2B is a diagram of an exemplary flight request weather logic 201 operable to consider as a source of flight risk data NOTAMs from an International Civil Aviation Organization (ICAO) NOTAM feed 250. In this non-limiting example, a flight management platform may receive a flight request 202 from a customer flight request feed 204, and may proceed similarly and/or with similar process flow to the process 200 of FIG. 2A. In this example, however, the process 201 further monitors a feed or other source of NOTAMs 250, which may serve as input to process logic, alert output, or the like, with respect to a planned flight.

One issue with conventional NOTAM monitoring systems is that, while some notices may be along or appear to correspond to a flight path, they may have little to no bearing on the actual flight at hand. Other NOTAMs may be general and/or of minor interest, while still others may have critical information relative to a flight. Accordingly, and in accordance with some embodiments, NOTAMs may undergo one or more selection or filtering processes for consideration and/or reporting within flight plan assessment logic 201.

In the exemplary embodiment of FIG. 2B, a NOTAMs feed 250 may undergo a first selection or filtering step by a "NOTAM Geo Engine" 252, which may select for (or remove from) further consideration NOTAMs that are, for instance, deemed relevant (or irrelevant) to a geographical region associated with a flight route. It will be appreciated that, in some embodiments, such a selection or filtration may be subject to or considered a suitable buffer of flight space for, for instance, situations in which a flight may be rerouted or diverted.

The embodiment of FIG. 2B further comprises logical processing in the form of a "NOTAM Filter and Ranking Settings" 254 or like system, which, in some embodiments, may contain logic or other processing that may prioritise and/or order NOTAMs selected by or allowed to pass through the Geo Engine 252. For example, NOTAMs from the feed 250 and selected by the Geo Engine 252 may be ranked or sorted by an importance, proximity, and/or urgency metric or grid. Returned results may be collated and prepared for presentation by a display or monitoring service 256, such as a NOTAM Prioritisation per Flight Request system 256. Such a NOTAM system 256 may further provide monitoring services during a flight to detect changes in a status or alert system. For instance, the system 256 may detect changes in the NOTAMs present, or a Flight Request timing or location. One or both of these functions may ensure that services and/or the provided information is relevant to the current Flight Request and NOTAMs, in accordance with some embodiments.

It will be appreciated that, in some instances, a Flight Request may change many times. For example, flights may be cancelled, given a new destination, require a Return to Base, dispatched to a new pickup or drop off points, or the like. Accordingly, flights may be dynamic in any number of manners. To this end, and in accordance with various embodiments, a NOTAM Prioritisation service 256 may be constantly on the watch for changes, and adapt quickly, given modern computer techniques. Any such changes may be given as, for instance, messages having associated Priority levels to Operational Control Specialists or Flight Followers, and may be "pushed out" as soon as they are prepared. In the exemplary embodiment of FIG. 2B, such messages may be delivered via a "NOTAM Notices & Alerts" map service 258, and may be made available to users of the network (e.g. any end users of the various aspects of the process 201) via, for instance, a Mission Web Map Service 246.

In accordance with various embodiments, logic for determining a NOTAM prioritisation may relate to various parameters. For example, a first embodiment may consider an "urgency" parameter. While such a parameter may be useful for some applications, other applications may additionally or alternatively include a "proximity" parameter, which may be more useful and/or comprise a different number of gradations (e.g. in comparison to some urgency parameters, which may be reported at the same urgency level if valid).

Moreover, some embodiments relate to prioritisation based on one or more of a collection of specific key word searches (e.g. customer-specific keyword searches, keyword searches from different customers, or the like), phrase searches, time filters, elevation filters, an "Impact to Flight" rating, which may be customisable and/or tailored in accordance with various parameters, weights, and/or formulae, a "Real Time Hazard Watch" on NOTAMs observed throughout the duration of a flight, or the like. In accordance with some embodiments, such a process may be performed before takeoff of a flight (e.g. during a Pre-Flight Briefing), and/or may run continuously during a flight in the event of a new NOTAM being issued during a flight. In accordance with some embodiments, presentation of such NOTAM data may be designed such that a list of NOTAMs (e.g. the entire list thereof) received from an ICAO feed 250 is re-ordered, and wherein NOTAMs are placed, displayed, or pushed based in part on an associated "impact to flight" rating. Furthermore, and in accordance with some embodiments, if an emergency is noted, an "impact to flight" rating may be re-processed to take into account the new scenario, which may in turn alter the significance of NOTAMs along the route. Alerts may additionally be generated for Operational Control Specialists and Flight Followers to alert them of any changes, and highlight such changes, in accordance with some embodiments.

In accordance with various embodiments, additional tools may be provided to customise NOTAMs prioritisation. For example, a "Focus" tool may be provided that allows manual entry of keywords or selection from a dropdown menu (e.g. a dynamic dropdown menu populated with the last ten unique keywords) to change the prioritization of importance/proximity graphing of NOTAMs. For instance, a user may select the word "towers", and have NOTAMs relating to "towers" given a higher priority. In accordance with yet other embodiments, prioritisation processes may further comprise modifiers (e.g. up to three or more modifiers). Furthermore, in some embodiments, provision may be made for a "Print Prioritized List" for a plain text (e.g. Courier font) output of all NOTAMs associated with or along a flight. In accordance with yet other embodiments, tools may be further provided for a graphical layer displayed on a map to select various aspects. For example, a selectable aspect may comprise, without limitation, a "level of importance" slider corresponding to a level of importance of NOTAMs that are shown (e.g. "All", "Only Important", or the like), a "proximity" slider (e.g. to selectively allow NOTAMs corresponding to near and/or far distances), or the like.

Such functionality may, in accordance with some embodiments, address various important aspects of flight safety. For example, depending on where a flight is planned, the type of aircraft used, and the applicable rule set (e.g. instrument or flight rules) associated with the flight, the "Importance-Proximity" grid representation of NOTAMs along a flight path may change. Accordingly, user-selectable bias controls may improve NOTAMs ranking or ordering, ultimately improving flight safety and decision-making. For example, a medical transport pilot may be cognisant of a low ceiling for a particular flight. They may thus prefer to have NOTAMs filtered such that tower-related NOTAMs (e.g. changes to towers in the area) are highlighted. In accordance with some embodiments, the pilot may thus select "Towers" as a NOTAMs feature of interest, to which a NOTAMs engine may accordingly respond, such as with "there are no Tower-related NOTAMs along the route", "There are three tower-related NOTAMs along the route", or the like. In accordance with some embodiments, a NOTAMs engine or system may further present or enable additional controls, such as "show on map", "print", or the like.

Figure 3:
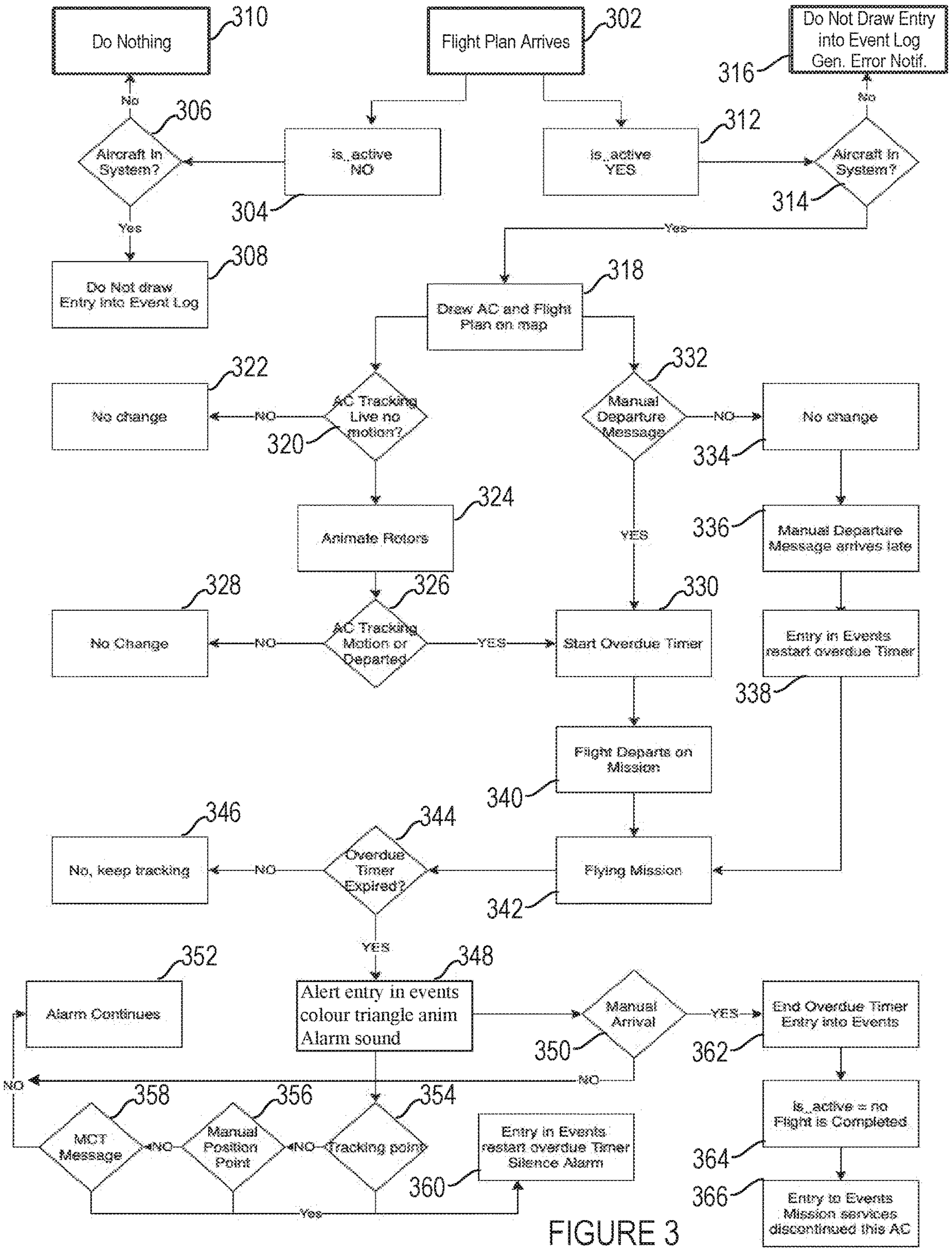
FIG. 3 is a diagram of an exemplary overdue alert decision tree, in accordance with one embodiment.

Various embodiments of a flight management platform relate to the provision of alerts of aircraft that may be overdue for mission completion. To this end, FIG. 3 is a diagram of an exemplary overdue alert decision tree, wherein exemplary logic steps are schematically represented in the context of an exemplary mission beginning with the submission of a flight plan 302.

Upon receipt of a flight plan 302, a flight management platform may determine that the flight plan 302 is not active 304. If the aircraft associated with the flight plan 302 is already in or known to 306 the flight management system, no events may be logged 308. Alternatively, if the aircraft is not recognised, no action may need to be taken 310. Similarly, if the received flight plan 302 is associated with an active flight 312, but the aircraft is not registered 314 by the system, a general error notification 316 may be provided, without specifically logging an entry within the system.

In accordance with some embodiments, monitoring of a known aircraft with an active flight plan may be provided via, for instance, graphical display 318 of a map and an icon representing the aircraft, as well as a representation of the associated flight plan. Indicators of the aircraft status may be provided based on, for instance, tracked motion of the aircraft. For instance, if the aircraft tracking 320 is live but no motion is detected, the aircraft icon may remain motionless 322. Detected motion may be indicated, via, for instance, animation of rotors 324 on the icon representing the aircraft. In the absence of, for instance, a departure signal 326, the graphical display may need not be changed 328. Alternatively, if tracking motion or a departure is detected 326, then a timer may be initiated 330. In accordance with some embodiments, an overdue timer 330 may similarly be initiated upon receipt of a manual departure message 332 at the platform. Either path may therefore signify that a pilot has begun a mission 340. Should such a manual departure message not be received, the platform may maintain all displays (i.e. no change 334). In the event that such a manual departure message arrives late 336, a message to that effect may be logged 338, wherein the timer may further be activated/reactivated 338, and at which point, the pilot may be assumed to be flying the mission 342.

While conducting the mission, the platform may check or receive data related to the overdue timer 344. Based on when the timer was initiated, it may be such that the expected mission time is still within the bounds of what was expected based on, for instance, the submitted flight plan 302 (e.g. known departure point, mission time, distance to a landing zone, etc.). In such a scenario, the platform may continue tracking 346 the flight and overdue timer. Should the timer expire prior to receipt of a signal that the mission has been completed, however, the platform may provide an alert 348 in the form of an alarm 348, a colour change 348 of the display related to the overdue flight, or the like, so to notify an OCS or like body that a flight is overdue and that there may be a safety concern. In the meantime, if no signal is received indicative of a flight returning, such as a manually submitted arrival 350, the alert or alarm may continue 352. Similarly, if no tracking points 354 may be identified, no position points have been received from a manual submission 356, and/or no message 358 has been received, such that from a cockpit messaging system, such as a mission control terminal (MCT), the alarm may continue 352. Conversely, if such position points 354 or 356, or an MCT message 358 has been received, the event may be logged 360, and the overdue timer may restart 360, optionally with a new value for the overdue timer (e.g. a value corresponding to 20% of the total mission time based on the status of the mission, or the like). On the other hand, should an arrival be received 350 by the platform after an alert 348 has been provided, data related to the arrival and alert may be logged 362, while the mission may be noted as completed 364 and the mission monitoring discontinued 366.

Figure 4A:
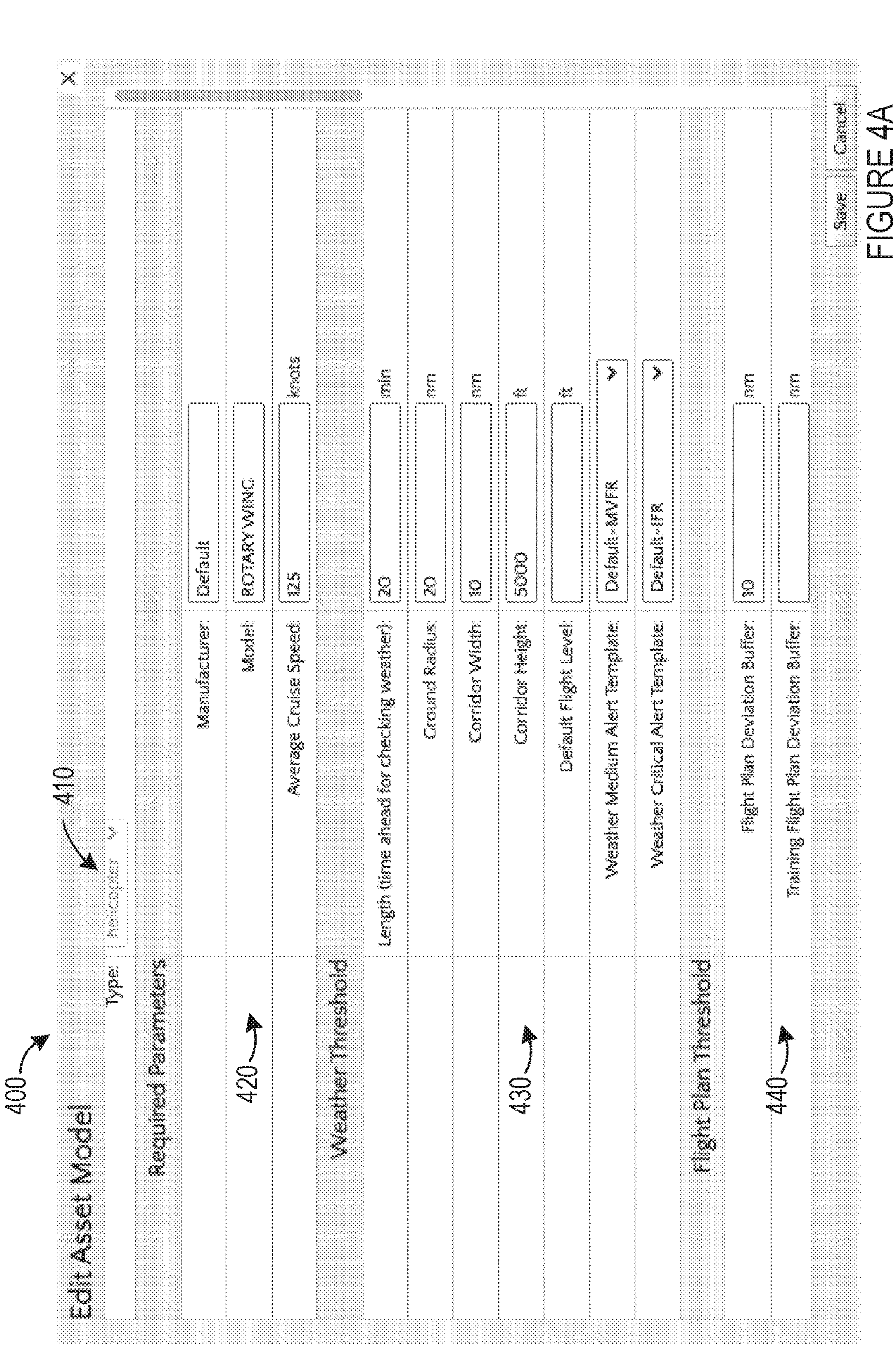
FIGS. 4A to 4C are images of an exemplary user interface for inputting aircraft parameter data, in accordance with various embodiments.
Figure 4B:
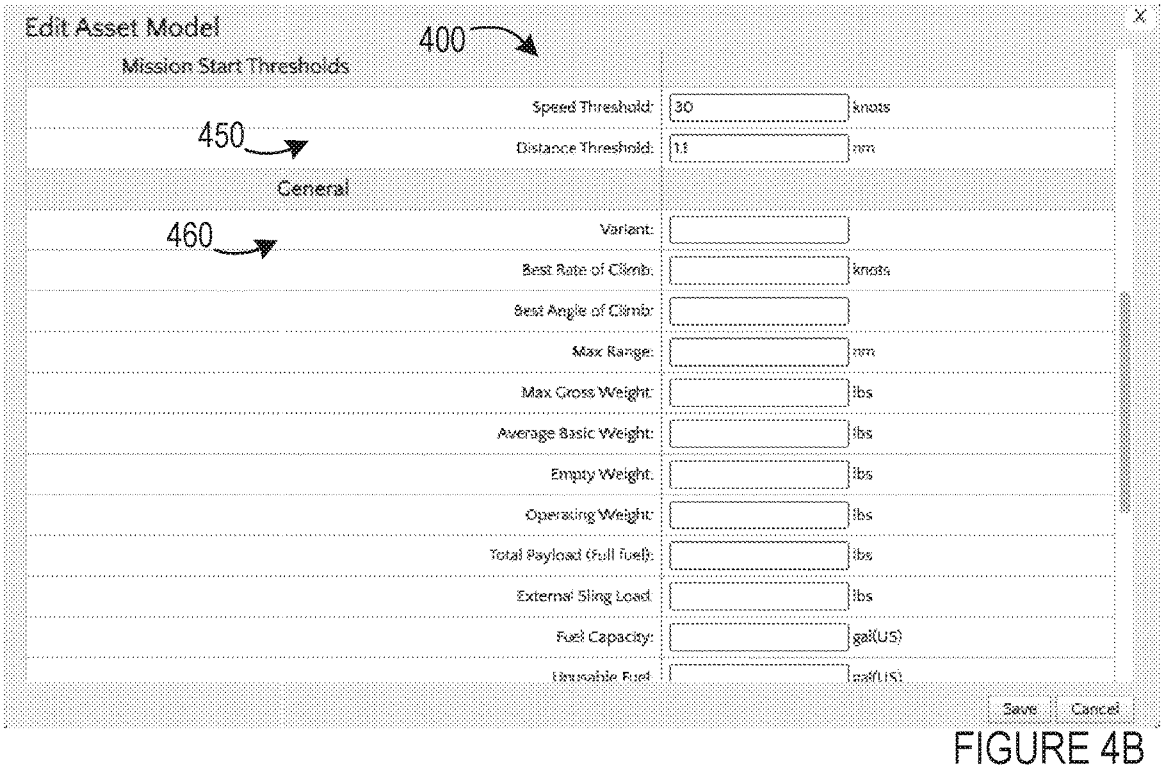
Figure 4C:
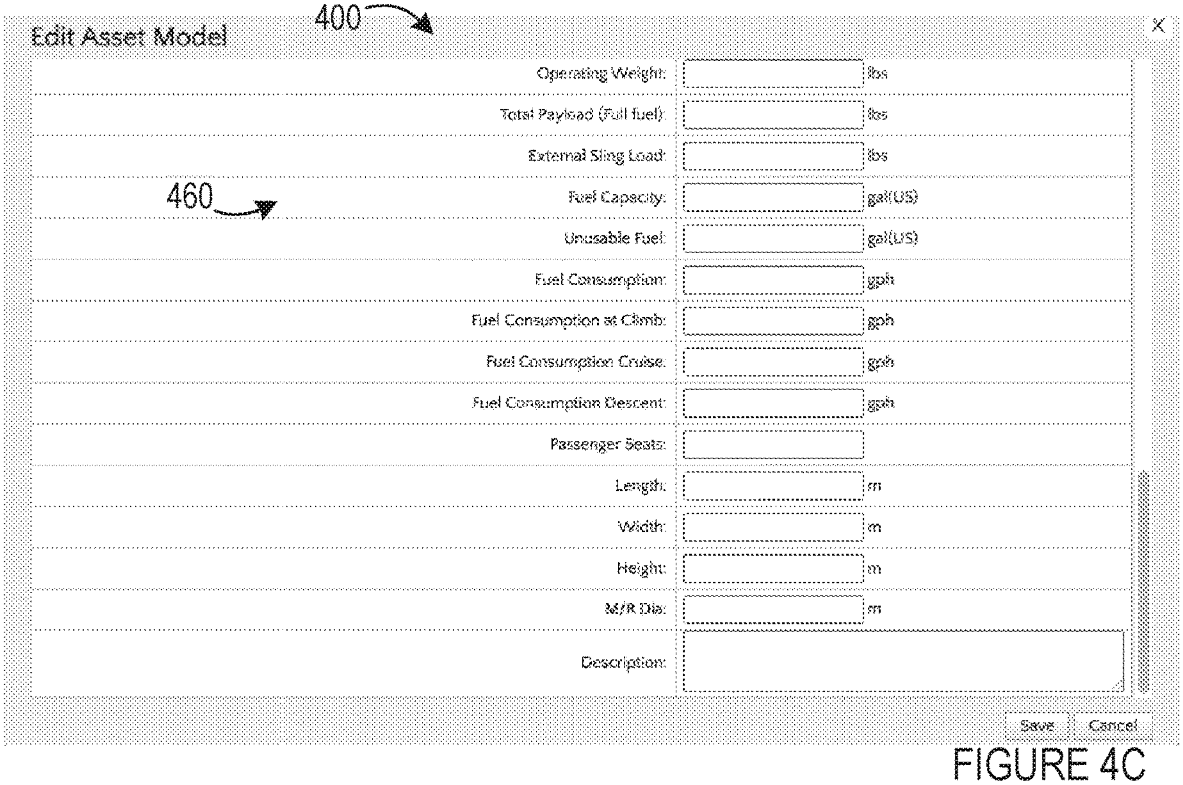

In accordance with various embodiments, aircraft-specific data may improve various mission dispatch processes, assessments related to flight plan with respect to weather or hazards, flight monitoring, or the like. For example, consideration of icing or other route hazards may be different for a helicopter performing a rescue mission than for a private tourism flight in a Cessna, and may accordingly be assessed, monitored, and/or reported differently. Accordingly, various embodiments relate to processes and systems that are operable to receive as input data related to an aircraft associated with a flight plan. To this end, and in accordance with various embodiments, FIGS. 4A to 4C show an exemplary user interface for inputting aircraft-specific data related to a submitted flight plan. In accordance with other embodiments, an array of input forms 400 may comprise fields for inputting template data related to, for instance, a class of aircraft or mission routes that may be selected for future flight plans. For instance, and without limitation, an OCS responsible for a fleet of aircraft may have a plurality of similar aircraft with similar mission objectives that are repeatedly carried out on demand. The organisation may further have several types of aircraft, each typically carrying out similar missions. Accordingly, the input interface 400 of FIGS. 4A to 4C may comprise an early process step of a fleet setup within a flight management platform to, for instance, rapidly input flight parameters associated with different aircraft to a flight management platform for rapid selection at a later time (e.g. in an emergency situation, such as in response to a dispatch request for an emergency rescue).

In the exemplary embodiment of FIGS. 4A to 4C, asset model entry forms 400 may comprise the entry of data related to, for instance, an aircraft type 410, general aircraft parameters 420, weather thresholds 430, flight plan thresholds 440, mission thresholds 450, general asset information 460, or the like. Non-limiting examples of aircraft types may include, for instance, a helicopter, an engine type or number, a wing or propeller configuration, or the like. General aircraft parameters 420 may include, for instance, an aircraft manufacturer, an aircraft model, an average cruise speed, or the like.

In accordance with various embodiments, weather threshold parameters 430 and/or flight plan thresholds 440 may be similarly input for all aircraft, or may be specific to each aircraft type, model, or the like. For instance, the exemplary input form 400 of FIG. 4A allows for input of weather-related thresholds 430 related to the anticipated length of time ahead of the aircraft along a flight route, a ground radius, and a corridor width and height, and a default flight level in which to check weather, as well as a medium and critical alert template in accordance with which a platform may provide alert. In accordance with one embodiment, such parameters may be requested for, for instance, all aircraft types. In accordance with another embodiment, different weather threshold parameters 430 may be requested for different aircraft types.

In the exemplary embodiment of FIGS. 4A to 4C, weather threshold parameters relate to a flight corridor in which to assess weather at a particular time, or over a particular time window (e.g. the takeoff time, the duration of the flight, the expected time at which an aircraft will be in a particular location, or in a particular area or volume of space based on flight plan parameters, the takeoff time and average cruise speed, or the like). For example, and in accordance with one embodiment, a pre-flight check may comprise assessing, based on a takeoff location, a landing location, and/or any locations of interest in between, including a flight corridor corresponding to the intervening volume of space based on a corridor width and height and a default flight level, a present risk assessment of weather throughout the entire predicted volume of space. In accordance with another embodiment, a flight plan assessment may comprise segmenting a predicted flight route into segments of a designated length (e.g. 5-, 10-, or 20-minute intervals of flight based on an average cruise speed, every 5 km, 10 km, and/or 20 km of a predicted flight path, or the like), and assessing a hazard risk based on a predicted time at which the aircraft will be within that flight route segment, for example, within a flight corridor (airspace weather volume height and width thresholds) defined for that segment.

In accordance with different embodiments, different flight plan segment airspace volumes may be defined depending on the types of thresholds applied thereto (e.g. rectangular and/or cylindrical coordinate thresholds) as well as the type of segment being considered. For example, a take-off or projected landing flight segment may have associated therewith a substantially vertically oriented airspace or corridor to address the rise/descent of the aircraft through various airspace elevation levels and corresponding weather patterns, whereas a cruising altitude flight segment may have associated therewith a substantially horizontal airspace segment volume or corridor to reflect travel mostly at or about a cruising altitude at cruising speeds. These and other flight plan airspace segment volume thresholds, limits or the like may be considered to fall within the general scope and nature of the present disclosure.

In the exemplary embodiment of FIGS. 4A to 4C, weather-related thresholds 430 further comprise alert templates related to medium and critical risk alert templates. Such templates may, in accordance with some embodiments, be preset based on, for instance, predetermined risk thresholds (as shown in FIG. 4A to 4C), or may be manually entered in similar forms. For example, and in accordance with one embodiment, such thresholds may be inherent in a platform as dictated by, for instance, jurisdictional or oversight standards for particular aircraft types. In accordance with other embodiments, a flight management platform may provide form fields similar to that 400 of FIGS. 4A to 4C for manual input of, for instance, medium and critical alert templates.

Again, with reference to FIGS. 4A to 4C, an asset template 400 may comprise the entry of data related to flight plan thresholds 440. In this example, flight plan thresholds comprise, inter alia, data related to a flight plan deviation buffer. This may relate to, for instance, the amount of space (or predicted flight time) that an aircraft may deviate from an expected flight route before an alert may be generated for a user of the flight management platform. Similarly, flight plan threshold form fields 440 may comprise additional elements, such as a training flight plan deviation threshold, or the like, which may allow for, for instance, more or less buffer space (or time) for deviation from a flight plan based on acceptable deviations from a predicted flight route during a training exercise.

Various other exemplary asset characteristic fields 400 are illustrated in FIGS. 4B and 4C. For instance, FIG. 4B illustrates exemplary mission start thresholds 450 comprising speed and distance thresholds that are to be assumed by a flight management platform at mission outset. FIGS. 4B and 4C further show general asset characteristics 460, non-limiting examples of which may include rates of climb, maximum range of the aircraft, weights of the aircraft (e.g.

max weight, max gross weight, average basic weight, empty weight, operating weight), total payload, external slight load, fuel capacity, unusable fuel, fuel consumption (e.g. general consumption, consumption at climb, cruise, and/or descent), the number of passenger seats, the aircraft width, length, height, and/or diameter, or the like. It will be appreciated that such inputs are provided as examples, and that various embodiments relate to a flight management platform that may include fewer or more inputs, depending on the application. For example, one embodiment relates to a flight management platform operable to access the asset parameters shown in FIG. 4A, while those presented in FIGS. 4B and 4C may not be required for, for instance, a helicopter rescue mission monitoring application.

It will be appreciated that additional or alternative form fields may be included with an asset model template 400, in accordance with different embodiments. Further, various embodiments relate to the customisation of asset models performed by a user of a flight management platform, by a governing or regulatory body associated with flight applications, or by an authority of the flight management platform itself. Asset model entry forms may further comprise raw data entry fields comprising fixed or optional unit entry fields. For example, various parameters may be entered in units of time, space, or the like, depending on the parameter or application of interests. Entry fields and/or associated units may further comprise, for instance, drop-down menus, or the like, for instance if only certain parameter sets (e.g. alert templates, acceptable corridor widths, or the like) are permitted. Further, various embodiments related to thresholds or asset type definitions that are fixed, or may be variable based on, for instance, user input, flight monitoring authorities, or as a function of a flight or weather status. For instance, a volume of airspace to be considered (e.g. a flight corridor) may comprise a variable cross section of interest to consider in view of a weather forecast based on a weather status (e.g. stormy or all-clear), or an amount of time until it is expected that an aircraft will be in a particular flight segment. For instance, a pre-flight check may comprise assessing a weather risk in the volume of space that is twice that indicated by the parameters in the asset model entry form 400, while an in-flight assessment may limit risk assessment to the volume of space indicated by the asset template 400, further as a function of the predicted time at which the aircraft will be in a particular segment of a flight route.

Figure 5:
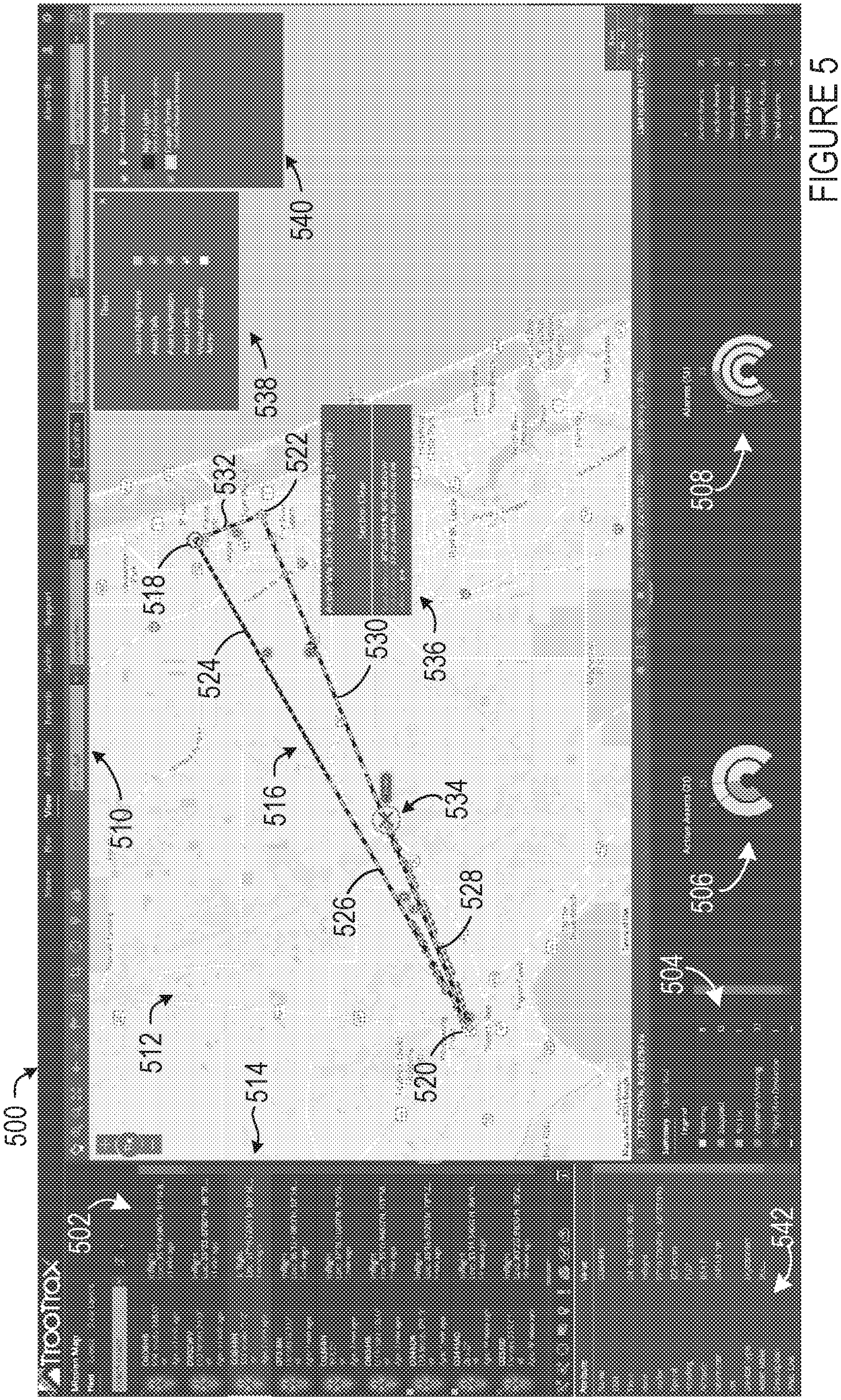
FIG. 5 is an image of an exemplary graphical user interface of an exemplary flight management system, in accordance with one embodiment.

With reference now to FIG. 5, and in accordance with various exemplary embodiments, an exemplary flight management user interface, generally referred to using the numeral 500, will now be described. While, in some embodiments, the exemplary interface 500 may relate to one that is employed in any of the embodiments described above (e.g. a web portal 116 of FIG. 1, the Mission Web Map Service 246 of FIG. 2A or FIG. 2B, the aircraft tracking and flight plan tracking interface 318 of FIG. 3), various embodiments may additionally or alternatively relate to a graphical interface 500 for assessing a flight plan, route, or risk in advance of a requested flight (e.g. upon submission of a flight request that includes takeoff and/or destination point(s), times associated therewith, aircraft types, and/or various other parameters input via, for instance, an asset model 400), monitoring a flight during performance of a mission, reviewing a flight post-mission, or the like.

In the exemplary embodiment of FIG. 5, the interface 500 comprises a list of aircraft associated with a user and the aircrafts' active flight plans. In accordance with different embodiments, the list may comprise a single aircraft (e.g. the aircraft for which a pre-flight check is being performed), or a plurality of different aircraft (e.g. hundreds of aircraft), optionally of different types, for which a user or organisation is responsible (e.g. an OCC responsible for a fleet of emergency response helicopters and other aircraft). In embodiments related to the latter notion, the list of aircraft 502 may comprise a list of active aircraft (e.g. a list of aircraft for which flight requests have been submitted, whether or not they are actively in flight), or a list 502 of all associated aircraft, whether or not there is a flight request and/or flight plan associated therewith.

In accordance with some embodiments, the interface 500 may further comprise a summary 504 of all aircraft associated with the user, or a summary 504 of active aircraft associated with the user. In this example, the summary 504 comprises a list 504 of aircraft that are currently moving, stopped, those for which there is no fix, those for which there is a weather warning (e.g. a weather hazard associated with the base in which the aircraft is located, and/or a weather risk associated with an aircraft in flight, or predicted to be in flight based on a flight plan and/or request, or the like), and those which have deviated from an anticipated flight route. The summary portion of the flight management interface 500 further comprises, in this example, a summary 506 of active assets (e.g. aircraft with active flight plans 506), and an alert summary 508 graphically showing a distribution of aircraft for which there are presently alerts. In this example, and in accordance with various embodiments, such summaries may be further refined, for instance by respective colours and/or via another visual cue (e.g. graphical bars, as shown in summary indicators 506 and 508), to show, at a glance, a general status of individual aircraft, or a fleet thereof. For example, the summary of active assets 506 indicates, in conjunction with the general summary 504, that 9 aircraft are presently moving, while 12 assets are stopped. Similarly, the alarm summary 508 indicates that there are presently 33 aircraft for which there is a weather alert, and that there is 1 aircraft which has deviated from a predicted flight route.

The exemplary embodiment of FIG. 5 further comprises a list of drop-down menus 510 with which a user (e.g. an OCS) may quickly access (e.g. visualise on screen, bring up alerts related to, or the like) aircraft of interest. For example, and in accordance with one embodiment, a drop-down menu 510 may allow a user to quickly navigate to an aircraft that has deviated from an expected flight route, or to a flight plan for which there has been a weather alert. In accordance with some embodiments, such subsequent drop-down menus 510 may allow for further refinement. For example, the drop-down menus 510 of FIG. 5 may, from left to right, allow a user to filter flights by alert type (e.g. weather-related, flight deviation, etc.), and further by specific flight plan or aircraft.

In accordance with various embodiments, the flight management interface 500 may further comprise a visual map layer 512. In accordance with some embodiments, a map interface may be provided by or otherwise accessed from a map service, such as a GIS-based application, or Google Maps. Accordingly a flight management platform, in accordance with various embodiments, may interface with various mapping platforms to provide a map layer 512 within an interface 500. In the exemplary embodiment of FIG. 5, the map layer 512 comprises a map overview of the region around a flight plan associated with the aircraft 514 highlighted in the list of aircraft flight plans 502 associated with that user. While the map region 512 is set to a scale in FIG. 5 so to show a single flight plan associated with the highlighted flight 514, it will be appreciated that such a graphical interface is scalable to show larger or smaller regions, for instance via scrolling with a mouse wheel, or clicking via zoom icon or scale bar on the interface 500, or the like, to expand/contract the scale that is being viewed on the map 512. For instance, a user may zoom outwards from the map scale shown in FIG. 5 to graphically display a portion of or all active flight plans on the map 512, depending on the application or particular goal of the user. Accordingly, such an interface 500 allows a user to readily monitor any one or more flight and/or flight plans in real time. For instance, a user may be presented with a map 512 comprising a general overview of all flights 502, from which the user may select an aircraft, flight plan, and/or region of interest by clicking on a particular asset in the list 502 of all assets, by sorting/filtering using drop-down menus 510, and/or by zooming in/out on the map 512 as needed.

For example, the map 512 of FIG. 5 shows a zoom on the active flight route 516 associated with the highlighted aircraft 514 of the list of assets 502. In this example, and in accordance with various embodiments, the flight route 516 is divided by the flight management platform into segments based on a submitted flight request. In accordance with various embodiments, a flight request may comprise a JSON or other format known in the art for including relevant flight data, such as a takeoff time and location, associated waypoints, mission details, or the like. For example, and in accordance with one embodiment, a flight request of the following form may be received or accessed by a flight management platform:

{“manifest_number”: 5972, “program”: “Air Flight Dispatch”, “flight_status”: “Active”, “estimated_depart_date”: “2020-11-09T15:40:43+00:00”, “estimated_eta”: “2020-11-09T18:42:43+00:00”, “request_date”: “2020-11-09T14:55:47+00:00”, “waypoints”: [{“description”: “LZ.”, “title”: “Hope Med Center”, “longitude”: −108.261362, “ground_time”: 0, “offset”: 0, “latitude”: 32.797753, “departed_date”: “2020-11-09T15:40:43+00:00”, “arrived_date”: “ ” }, {“description”: “LZ.”, “title”: “Memorial Med Center-Kenaston”, “longitude”: −106.735333, “ground_time”: 69, “offset”: 37, “latitude”: 32.291667, “departed_date”: “2020-11-09T17:27:31+00:00”, “arrived_date”: “2020-11-09T16:18:21+00:00”}, {“description”: “KDMN-DEMING MUNI AIRPORT”, “title”: “KDMN”, “longitude”: −107.719, “ground_time”: 19, “offset”: 135, “latitude”: 32.262333, “departed_date”: “2020-11-09T18:17:13+00:00”, “arrived_date”: “2020-11-09T17:57:20+00:00”}, {“description”: “LZ.”, “title”: “Air Flight Base 32 (base)”, “longitude”: −108.261333, “ground_time”: 30, “offset”: 182, “latitude”: 32.797833, “departed_date”: “ ”, “arrived_date”: “2020-11-09T18:45:31+00:00”}], “tail number”: “N543A”, “is_active”: “yes”, “pilot_name”: “Harry Pendergast”, “comm_spec_name”: “Jill Tundress”, “dispatch_number”: “4850”, “risk_score”: 42, “reason”: “update”, “base”: “NM, Bangor”, “ocs_name”: “Jack Callister”, “manual_positions”: [ ], “flight_type”: “Hospital Flight”, “api_key”: “Dispatch.helicopter”, “flight_request_id”: “2N276NV806NDFGTY5463245”}.

In the example of FIG. 5, the flight request comprised a flight plan in turn comprising a takeoff and landing location 518 with intervening landing and takeoff positions 520 and 522. The flight management platform, in accordance with various embodiments, utilised this information, in conjunction with aircraft data (e.g. that entered/accessed via a module asset editor 400), to automatically generate a flight route 516 partitioned into sequential flight segments 524, 526, 528, 530, and 532. While these segments were automatically generated by the platform using the flight plan information and parameters 400 associated with the aircraft, it will be appreciated that such segments may be altered, or manually input by a user (e.g. an OCS, a pilot, or the like), to generate or adjust flight segments based on, for instance, the application at hand (e.g. a regularly scheduled helicopter route, a specific rescue mission, or the like), or based on a predicted weather forecast displayed in a map overlay 512 (e.g. adjust segment length depending on a high probability of hazardous weather conditions on one or more segments of the flight route 516).

In the example of the FIG. 5, the present position of the aircraft is indicated by the aircraft icon 534. However, it will be appreciated that the flight route 516, segments thereof, any alerts associated with the flight route, or the like, may be assessed or evaluated pre-and/or post-flight, for instance via stored values associated with the flight request and/or weather mapping. Nevertheless, in this example, the present position of the aircraft 534 is correlated with the flight segment 528 of the flight route 516.

Based on the present time and/or position of the aircraft, and in accordance with some embodiments, the flight route, and/or all segments 524, 526, 528, 530, and 532 thereof, may indicate a status thereof in view of the aircraft position 534 via the graphical representation of the flight route 516. As the platform has access to weather and hazard alerts and/or data, as described above, the platform may assess, in accordance with various embodiments, any or all segments of the anticipated flight route 516 for potential hazards, and, in accordance with various embodiments, may indicate potentially hazardous segments and/or routes via the indicated flight route 516 or segments thereof. In this example, the flight route, and all segments thereof, have been assessed by the flight management platform, based at least in part on weather/hazard data and the thresholds associated with that aircraft (e.g. based on asset information 400 associated with that aircraft), as being low risk (i.e. “all-clear”). This may be indicated by, for instance, the colour scheme or insignia representing each flight segment (e.g. green for low risk, yellow for medium risk, red for critical risk), and/or the absence of alerts presented to the user by the interface 500. In this example, the “all-clear” signal is further indicated by the detail window 536 when the flight plan associated with the aircraft 514 was hovered upon via a mouse, although various embodiments relate to such alerts being automatically generated or brought to the forefront of the interface in the case of, for instance, a weather alert or NOTAM associated with a flight plan.

Further, and in accordance with some embodiments, the aircraft icon 534 position with respect to the flight route 516 indicates the aircraft has completed segments 524 and 526 of the flight route 516 (i.e. it has traveled counter-clockwise about the planned route 516). Accordingly, the first route segment 524 has been indicated as complete (and is no longer monitored), as shown by the lack of hazard indicator (e.g. a black band, rather than a colour indicator) along the segment 524. However, and in accordance with various embodiments, the more recently completed segment 526, as well as the current segment 528, may continue to be monitored by the flight management platform. For instance, it may improve aircraft safety to continue to monitor recently completed segments, as well as intervening landing zone 520, should the aircraft need to be rerouted in the case of a detected hazard.

The graphical interface 500 further illustrates, in accordance with some embodiments, current attributes and associated values 542 of the selected aircraft 514. In accordance with various embodiments, such aircraft attributes 542 may include aspects related to the selected aircraft name, the last recorded time, aircraft state, current position (e.g. latitude and longitude), speed, heading, and/or altitude, or the like.

The interface 500 further shows, in accordance with various embodiments, user interaction fields 538 and 540 representing togglable user display preference fields related to, respectively, fleet assets and map layers. Exemplary display options may include, for instance, asset flights, asset tails, asset animations, asset labels, weather advisory areas, asset locations, map night view, Google Terrain, NOTAMs, or the like. It will further be appreciated that various display options may be offered depending on, for instance, the application at hand, or a view mode that the user has selected in various other aspects of the interface 500.

Figure 6:
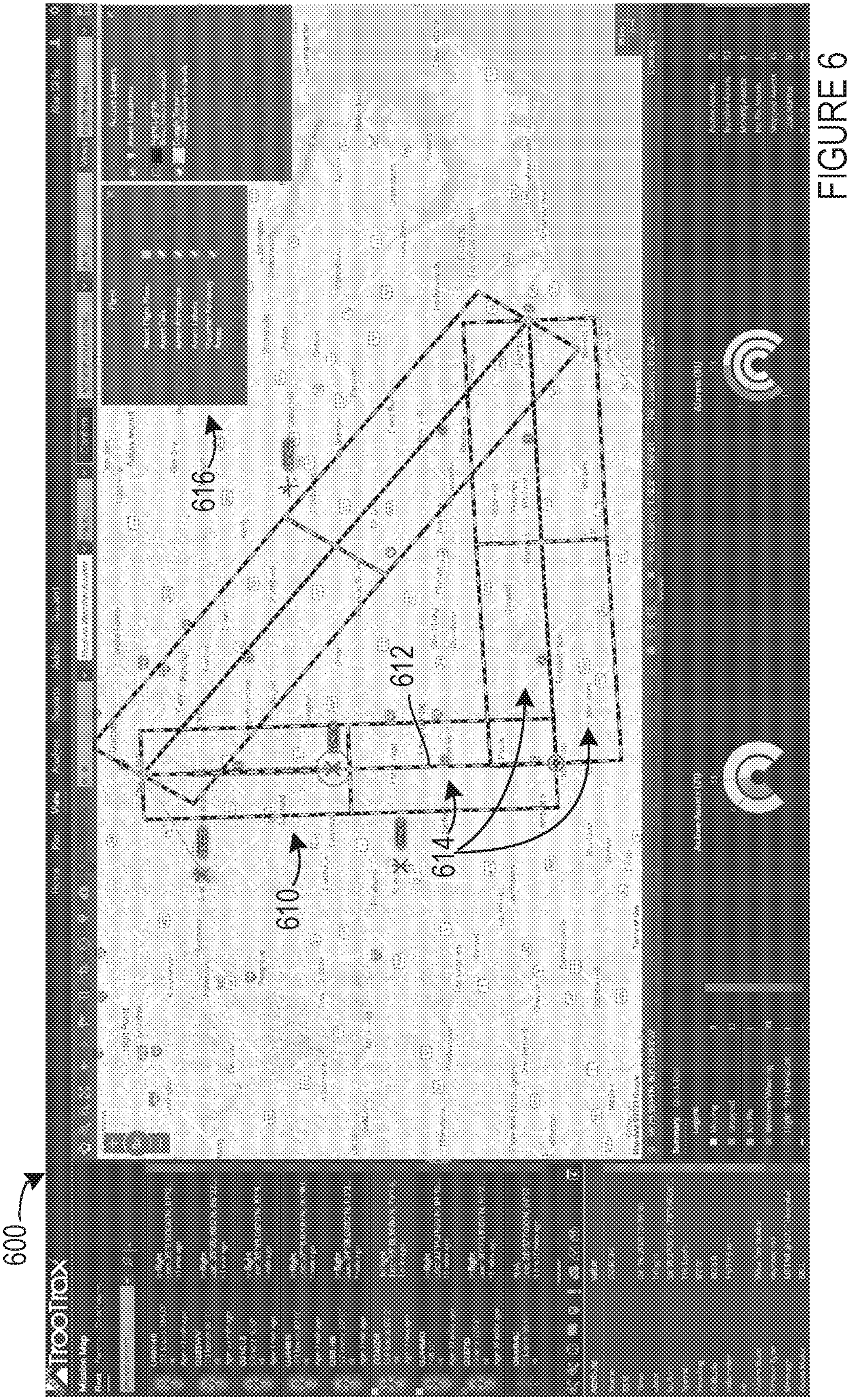
FIG. 6 is an image of an exemplary graphical user interface showing weather advisory areas associated with flight path segments, in accordance with various embodiments.

For example, and in accordance with various embodiments, the exemplary interface 600 of FIG. 6 shows a graphical representation of a flight plan 610 comprising not only the anticipated flight route 612 (similar to the flight route 516 of FIG. 5), but also the weather advisory area 614, as the user has activated this layer in the display properties fields portion 616 of the interface 600. That is, the weather advisory area 614 being monitored (e.g. the regions 614 designated based on the aircraft weather monitoring thresholds 430, such as the air corridor associated with that aircraft) is indicated by the rectangular sections 614 surrounding the segments of the flight route 612 generated by the flight management platform. It will be appreciated that while such a graphical representation of weather advisory or other alert monitoring areas 614 may be helpful for a user (e.g. an OCS) in visually assessing hazard risks, such layers may serve as visual cues that may be optionally layered on other graphical interface layers, and that various flight monitoring aspects may comprise different areas or volumes of space that may be handled differently with respect to hazard assessment. For example, while the volume of space represented by rectangles 614 on the graphical interface 600 may represent volumes of space being compared with temperature or dew point forecasts for a particular segment(s) of a flight route, airspace corridors being assessed for storm forecasts or terrain hazards may comprise a greater or lesser volume than that graphically represented by the weather areas 614. Further, and in accordance with various embodiments, weather advisory areas 614 or NOTAMs may optionally be displayed or removed, depending on the preference of the user. For example, in the graphical interface 600 of FIG. 6, the user has enabled the "Weather Advisory Areas" toggle in the "Fleet" view of asset allocations 616, and may simply disable the toggle when desired.

Figure 7A:
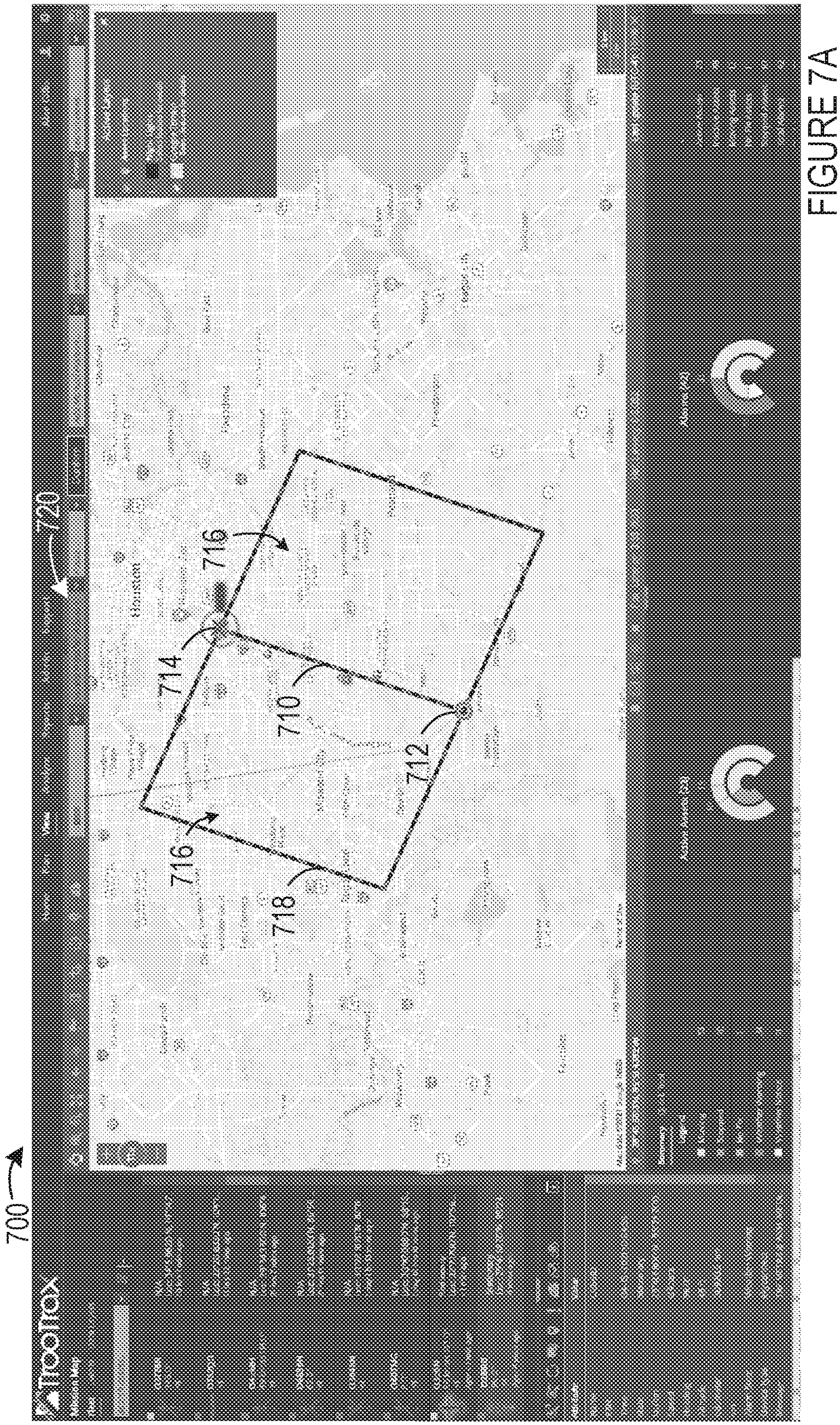
FIGS. 7A and 7B are images of an exemplary graphical user interface displaying a flight path and associated weather advisory areas in accordance with a critical flight risk, in accordance with various embodiments.
Figure 7B:
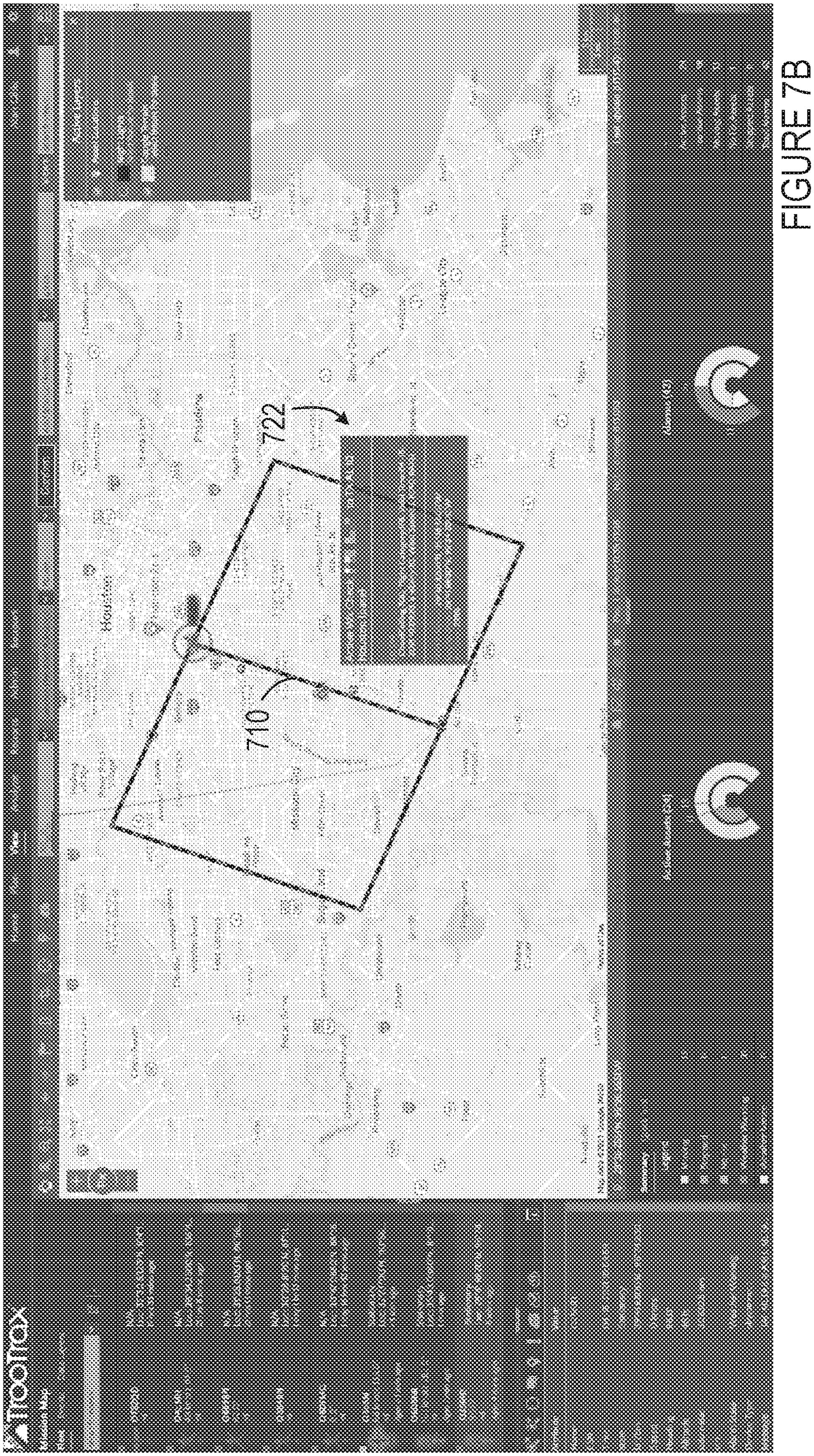

In accordance with various embodiments, FIG. 7A shows another exemplary aircraft flight plan assessment via a flight management platform interface 700. In this example, both the flight route 710 calculated by the platform using a flight request comprising takeoff 712 and landing 714 points, as well as the alert areas 716 employed by the platform to monitor potential risks associated with the flight plan, are shown. However, in comparison to the "all-clear" indicator associated with the flight route 516 of FIG. 5, both the flight route 710 and alert area 716 boundary indicator 718 indicate, via a colour scheme of their respective graphical insignia, indicate that there is a hazard associated with the flight route 710. In this example, the user was quickly able to graphically navigate to the at-risk flight route 710 based on the drop-down menu 720, which automatically and clearly indicated the severe weather alert. In accordance with some embodiments, the user may further be able to view a more detailed report 722 of the alert by clicking on or hovering over any of the components of the graphical representation of the aircraft, the flight route 710, or the like, as shown in FIG. 7B.

Figure 8:
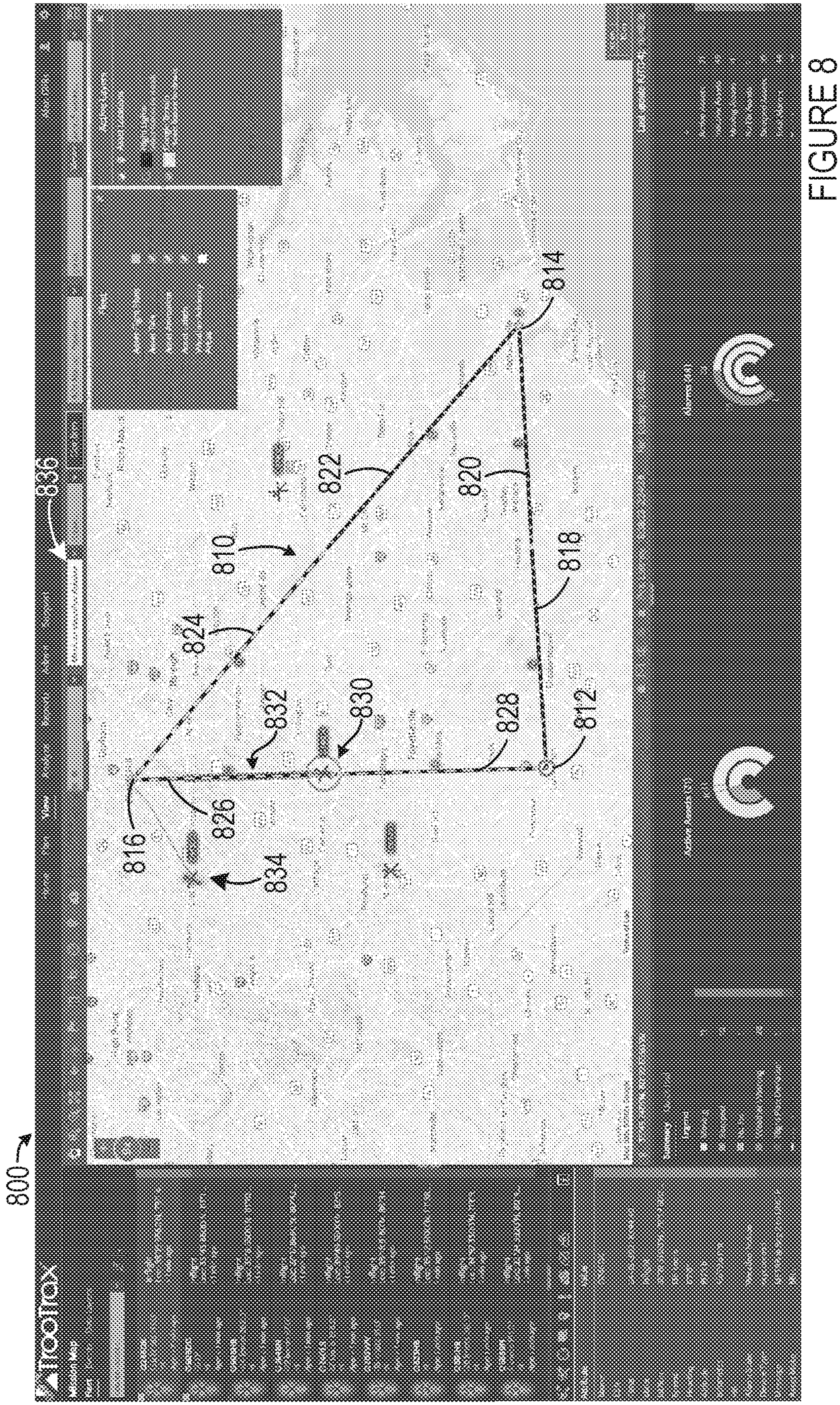
FIG. 8 is an image of an exemplary graphical user interface displaying a flight path in accordance with various flight hazard risks of varying severity, in accordance with various embodiments.

Further highlighting the versatility of a flight management platform for assessing potential flight hazards, and/or a severity level or a variety thereof, and in accordance with various embodiments, FIG. 8 shows yet another flight management interface 800 monitoring a flight route 810. In this example, a flight request was first submitted indicating that the aircraft was departing from the takeoff location 812 and would land and subsequently take off at, in order, locations 814 and 816, before returning to the original base 812. Upon receipt of the flight request, the flight management platform, having access to known asset information (e.g. asset information 400), automatically generated an anticipated flight route 810 and hazard assessment areas (not shown), which was automatically segmented into sequential flight legs or segments 818, 820, 822, 824, 826, and 828.

In this example, the present aircraft position 830, as determined from, for instance, GPS measurements received by the platform from an in-aircraft instrument, shows that the aircraft is currently traversing the segment 826, having traveled counter-clockwise around the anticipated route 810. Again, this example highlights how segments 818, 820, and 822, having already been completed (e.g. due to an elapsed time since traverse of the respective segments, and/or because there is at least one landing base along the flight route in between the aircraft position 830 and the respective segments), are no longer monitored, as indicated by the lack of an alert or indication along the respective flight route segments (e.g. no insignia or colour-coding scheme associated with the flight route segment). Ahead of the aircraft 830, there is an "all-clear" indication interpreted from the colour of the displayed flight segment 828. However, while the current flight segment 826 is generally indicated by an all-clear colour scheme with respect to weather hazards (e.g. the upper region of segment 826), the return route 832 (i.e. the expected route should the aircraft 830 return to the previous landing space 816) indicated via an additional colour indicia 832, as well as a highlighting 832 of the return route to the landing zone 816, shows that there is a potential risk that is not weather-related. Indeed, the flight management platform, having automatically identified from data associated with another flight 834 (e.g. the flight position 834, as well as route data associated therewith), has provided an alert related to a potential hazard corresponding to the interference between the currently displayed flight route 810 and the nearby flight 834. Accordingly, the flight management platform has indicated via the interface 800 that there is a potential flight risk associated with the flight route 810, as there is the potential for a dangerous situation should the aircraft 830 require a return to base at the prior landing position 816.

Further, and in accordance with various embodiments, the second-most-recently traversed flight segment 824 yet further indicates via a colour indicium associated with that segment 824 that there is a medium weather advisory associated with the segment 824. In this example, this medium weather advisory was quickly located using the drop-down menu item 836 and sorting for medium weather advisories, bringing the flight route 810 to the forefront of the graphical interface 800 for review within two mouse clicks.

Accordingly, a flight management platform is operable, in accordance with various embodiments, to automatically assess a wide variety of potential flight risks. Moreover, a flight management platform, in accordance with various embodiments, readily interfaces with a variety of data sources to automatically bring to the attention of a user the nature of such risks, as well as provide relevant and detailed data related thereto to the user's attention. Non-limiting examples of potential flight risks, including a severity thereof, that may be monitored, may include smoke, air traffic, birds, cold fronts, warm fronts, occluded fronts, freezing level, wind gusts on the ground, wind value on the ground, flight category (e.g. low instrument flight rules, instrument flight rules, marginal visual flight rules, visual flight rules, or the like), radar category (e.g. rain, freezing rain, snow), radar reflectivity (e.g. in dBm), dew point spread, visibility, ceiling, turbulence, significant meteorological information (e.g. SIGMETs), storm tracks (e.g. from radar measurements), storm types (e.g. mesocyclone, heavy rain, hail, severe hail, tornado, etc.), or the like. Similarly, a flight management platform may utilise any accessible METAR information reported by a station, as well as any information reported in a terminal aerodrome forecast (TAF), the scope of which will be appreciated by the skilled artisan. Various embodiments therefore further relate to a platform that is readily communicable with data sources related to flight risks (e.g. via use of appropriate API languages or queries, programming languages, or the like).

Furthermore, and in accordance with various embodiments, any or all of these flight risks may be parsed by time (e.g. in the future), and/or by altitude (when the attribute is not a surface attribute). Accordingly, a flight management platform, in accordance with various embodiments, may compare an expected flight path as a function of time (i.e. where the aircraft is expected to be at times in the future) with a predicted hazard forecast (e.g. risk of lightning or rain) for the predicted flight path at the time in the future corresponding to when the aircraft is expected to be there. Similarly, the flight management platform may compare the flight route (as a function of time) with that of other known aircraft in the area to assess a potential flight risk due to crowded airspace, also as a function of time, in accordance with some embodiments.

Figure 9:
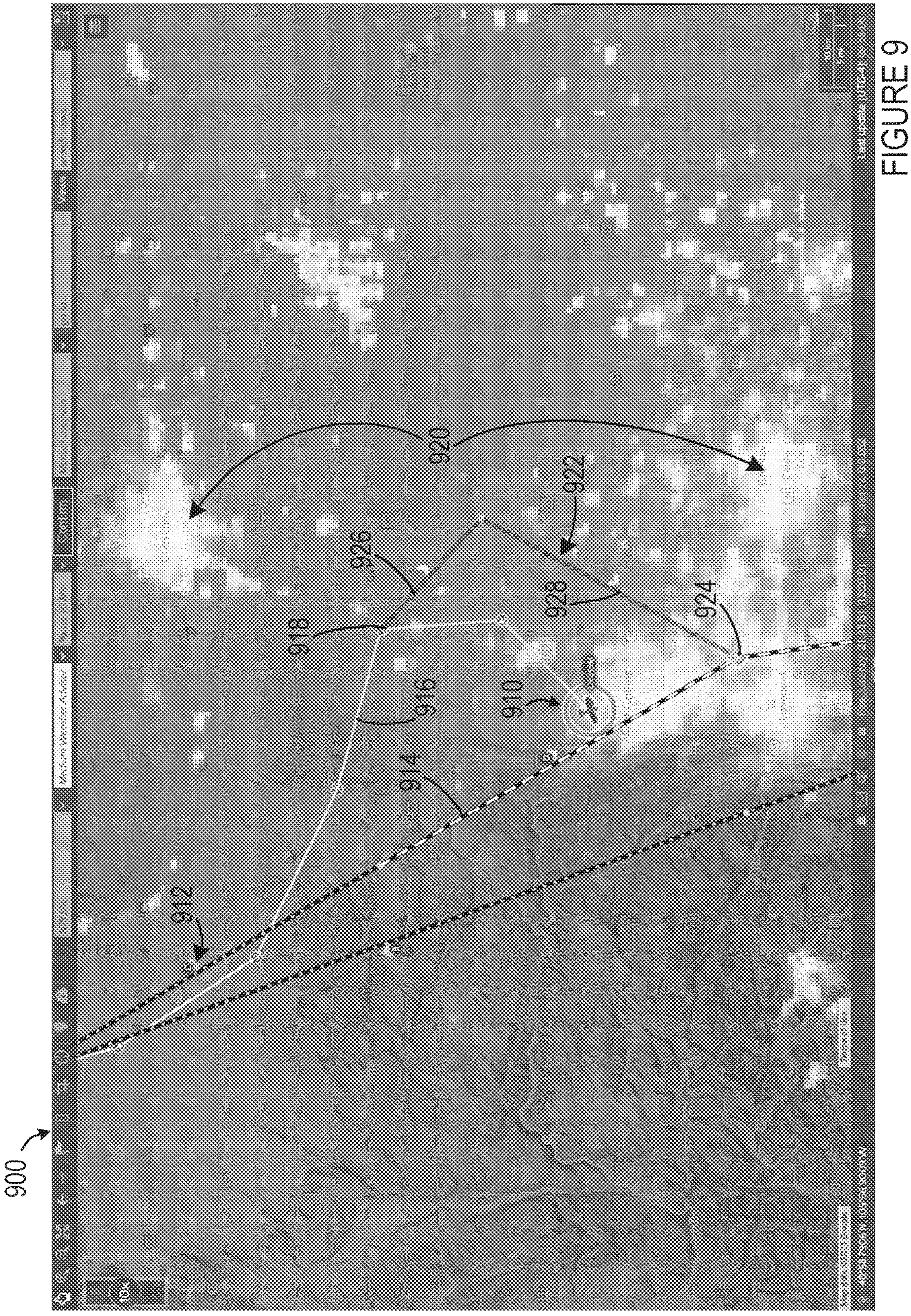
FIG. 9 is an image of an exemplary graphical user interface displaying an updated flight path automatically generated by a flight management platform in response to a flight deviation, in accordance with various embodiments.

In accordance with yet other embodiments, a flight management platform may further be operable to assess whether an aircraft has deviated from an expected flight route, and to report on any such deviations. For example, and as described above, an asset definition 400 may comprise data related to how far a particular aircraft or asset type may deviate from an expected flight path before generating an alert to a user of the platform. FIG. 9 shows, in accordance with some embodiments, how a flight management platform may address such an excessive deviation from an anticipated flight path, and display data related thereto via a graphical interface 900.

In this example, the aircraft 910 was observed to deviate from an expected flight route 912. In particular, the aircraft 910 deviated from the flight segment 914 automatically identified by the flight management platform upon receipt of a flight request, and instead took the flight path 916, as identified using real-time measurements of position and heading of the aircraft indicated by point-like arrows 918. While such a situation may arise due to any one or more complications experienced during a flight, this deviation likely arose due to a weather risk associated with the flight path 912, as indicated by the weather overlay included in this view of the interface 900 and comprising medium-risk weather conditions 920, in accordance with one embodiment.

In this example, it was automatically identified by the flight management platform that the aircraft 910, based on aircraft position and/or heading measurements 918, had deviated from the anticipated flight path segment 914. Accordingly, the platform produced an alert to an operator associated with the aircraft via the interface 900. Meanwhile, and in accordance with various embodiments, the flight management platform generated a new anticipated flight path 922. In this example, the flight management platform specifically generated a new anticipated flight path in view of the next anticipated destination 924 for the aircraft 910 and the position and heading 918 of the aircraft upon recognition of the flight path deviation. Accordingly, and in accordance with one embodiment, the flight management platform automatically generated the flight plan 922, which in turn comprised automatically generated anticipated flight path segments 926 and 928. The first segment 926, in accordance with one embodiment, comprises a designated length and heading based on the previous measurement 918. The second segment, in accordance with this embodiment, returns the aircraft from the end of the first segment 926 to its previously anticipated destination 924.

Figure 10:
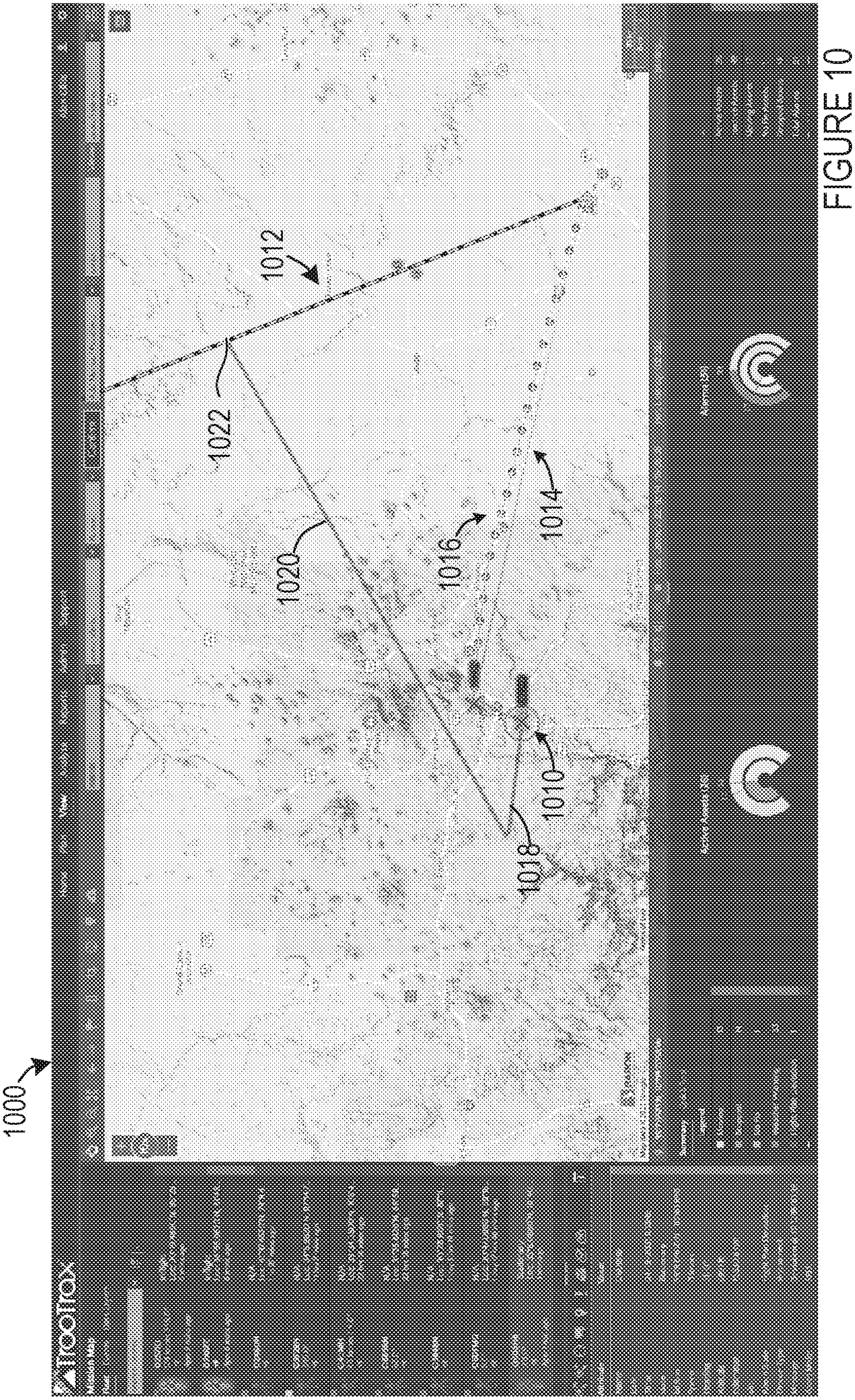
FIG. 10 is an image of an exemplary graphical user interface displaying an updated flight path generated in response to a flight deviation, in accordance with one embodiment.

FIG. 10 similarly shows an exemplary flight deviation assessment and rerouting via a graphical interface 1000. This example again shows an aircraft 1010 that has deviated from an anticipated flight plan 1012, and instead assumed the route 1014 indicated by the position and heading readings 1016. At the current position and heading of the aircraft 1010, the flight management platform recognised that the aircraft had deviated from the anticipated route 1012, generating a new or deviated flight route comprising segments 1018 (based on the current position and heading and the aircraft) and 1020 (bringing the aircraft back to the starting position 1022 of the previously generated subsequent flight segment of the flight route 1012).

While FIGS. 9 and 10 represent one potential rerouting process (e.g. using a current position/heading for a first segment, and a return-to-route segment for a second segment), it will be appreciated that various processes may be employed to determine or estimate an anticipated flight path during a rerouting process, in accordance with various other embodiments. For example, these embodiments relate to the use of pre-stored flight deviation parameters input during an asset definition process 400, including an amount of deviation that is permitted before a rerouting or flight deviation assessment is performed, as well as preset parameters related to a first-segment generation process upon recognition of a deviation. However, other embodiments relate to a linear regression or like process based on additional or alternative aircraft parameters to determine an anticipated route based on recognition of a flight deviation.

Regardless of the process by which an aircraft is rerouted, various embodiments relate to a flight management platform operable to automatically determine that an aircraft has deviated from an anticipated flight plan based on automatically received data related to the aircraft position and/or heading in consideration of an anticipated flight plan, path, or route. Yet other embodiments further relate to the generation of a new flight path (e.g. rerouted path 922) in a segmented fashion. In accordance with yet further embodiments, a flight plan, flight route, or segmented flight path or route, automatically generated in response to a sensed flight path deviation, may be automatically tested against potential hazards (e.g. weather, terrain, interfering aircraft, or the like)

to provide an alert (e.g. a graphical alert, a warning, one or more indicia, alarms, or the like), in addition or as an alternative to displaying a rerouted flight plan via a user interface (e.g. interfaces 500, 600, 700, 800, 900, and/or 1000), in response to the noted deviation.

Importantly, such assessment may be beneficial in determining an otherwise unknown risk to an aircraft in real or near-real time. While it is common for an aircraft to deviate from an anticipated flight route for any number of reasons, a need still exists to assess potential hazards along a flight route that has been decided, quite literally, on-the-fly. While it is conventionally possible to input a flight request and assess a risk at, for instance, a takeoff and landing location, and possibly the intervening space in between, such processes are conventionally performed well before a flight is scheduled. On the other hand, there is an urgency to understand in real time the risks associated with an airspace through which an aircraft will pass, particularly when the aircraft is in unanticipated airspace. Various embodiments of a flight management platform as herein described therefore address, among other aspects, this need. Further, various embodiments relate to the assessment of this need in a segmented fashion, as may be inferred from various known aspects of an aircraft, so as to granularise flight segments for improved risk assessment. Further, a flight plan generated in response to a flight deviation may be assessed, in accordance with some embodiments, in a buffered region around the space in which the aircraft will pass (optionally also in a segmented fashion). This may be beneficial should, for instance, the aircraft further deviate from a current position, or to account for a corridor of aircraft flight that corresponds better to the actual path that will actually be taken by the aircraft than that corresponding to a no-longer-accurate pre-flight plan submitted for assessment in advance of up-to-date weather and/or position data (e.g. pre-flight).

Figure 11:
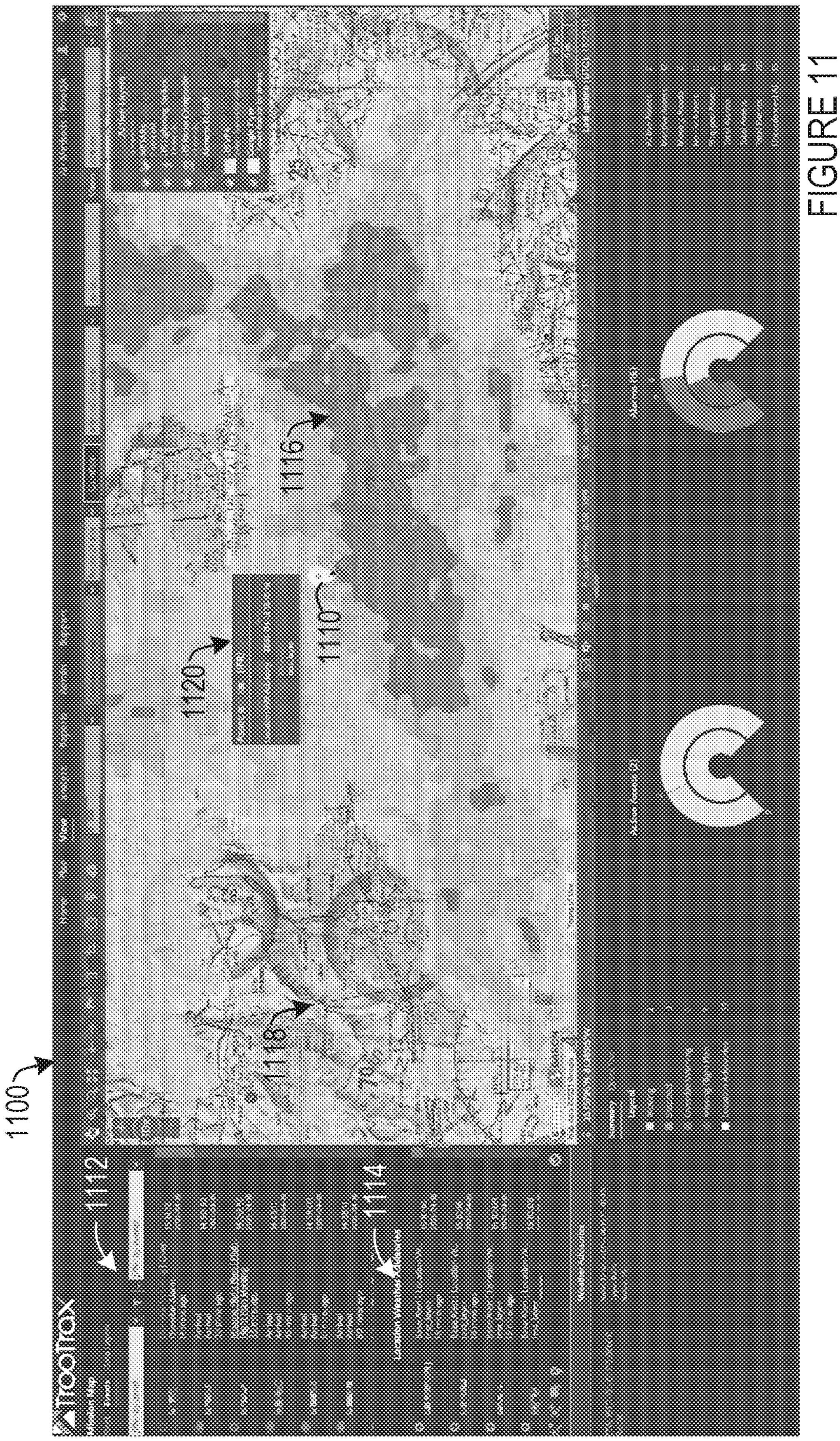
FIG. 11 is an image of an exemplary graphical user interface of a flight management platform monitoring flight risks at a geographical location, in accordance with various embodiments.

While embodiments described thus far generally relate to assessment of airspace with respect to an aircraft, various embodiments may further relate to a flight management platform for assessing and monitoring airspace with respect to a geographic location. For example, and without limitation, FIG. 11 provides an exemplary flight management platform 1100 configured to display flight risk-related data with respect to an aircraft base 1110. Accordingly, a user (e.g. an OCS, a private pilot consistently flying out of the same airport, or the like) may monitor a geographic location for relevant flight risks. For example, the interface 1100 of FIG. 11 displays aircraft events 1112 related to the geographical location or base 1110 that have been recently recorded, as well as weather advisories 1114 provided for that location 1110. As with the other embodiments described above, various embodiments of a location-specific flight monitoring platform relate to the (optional) provision of various display layers, a non-limiting example of which includes the weather indicator layer 1116 overlaying the general map layer 1118 of the interface 1100. Similarly, and in accordance with various embodiments, various levels of detail may be provided with respect to an alert or other noted aspect related to the flight management platform for a geographical region or flight, as exemplarily depicted in FIG. 11 as the test weather alert notification 1120 for a selected aircraft at the base 1110.

Figure 12:
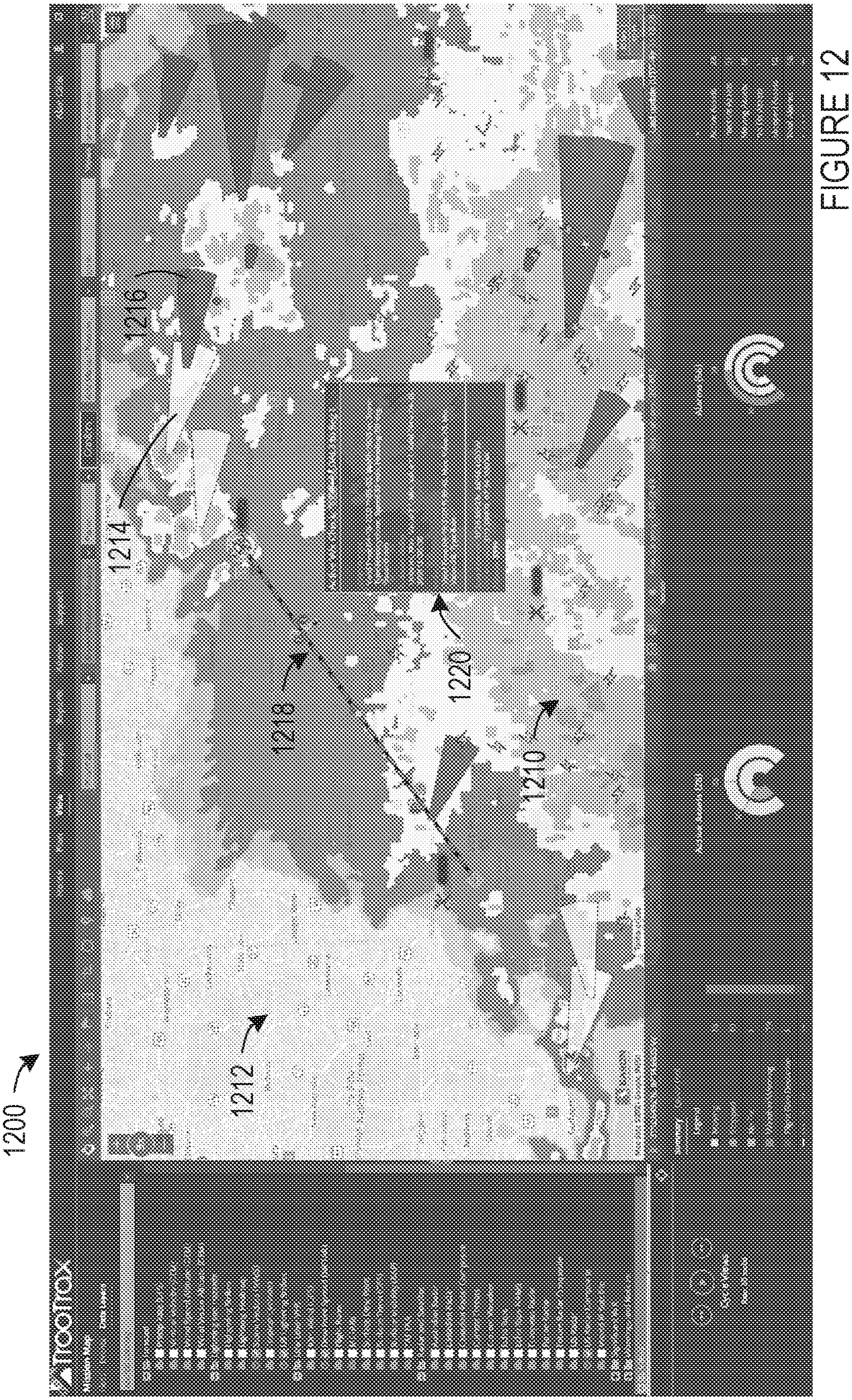
FIG. 12 is an image of an exemplary graphical user interface displaying a flight path in accordance with critical flight risk, and a corresponding weather data overlay comprising indicia corresponding to severe weather conditions, in accordance with one embodiment.

Whether related to an aircraft or a geographical position, various aspects relate to the provision of various graphical overlays for user consumption via a graphical user interface, as described above. For example, and in accordance with various exemplary embodiments, FIG. 12 shows one exemplary interface 1200 comprising a weather data layer 1210 overlaid on a geographical map layer 1212. In this example, flight management platform displays the real-time weather layer 1210, accessed by a weather provider or weather alert provider, as described above, in accordance with user defined parameters (e.g. togglable switches in the interface 1200). In this example, various severe weather alerts are displayed as insignia 1214 and 1216 corresponding mesocyclones, wherein, for instance, the colour and orientation of the insignia 1214 and 1216 may correspond to, respectively, the severity and direction of travel of the potential flight hazard. In this example, the graphical interface 1200 displays the weather hazard overlay 1210 with reference to a proposed flight path 1218, as indicated by the detailed weather hazard alert 1220 displayed in response to the user hovering a mouse point over the flight path 1218. However, it will be appreciated that such overlays 1210 may be presented independently on, for instance, a map 1210, without reference to a flight plan 1218, in accordance with various embodiments.

In accordance with various embodiments, a flight management platform may integrate and automate the many steps that an OCC air traffic controller must take to determine an aircraft is entering a hazardous situation while also assessing a risk associated therewith. The process may conventionally take approximately 10 minutes to 20 minutes, as multiple processes must access and digest a multitude of data sources, weather maps, flight plan maps, trajectory calculations, and the like. Conversely, the high-risk air ambulance industry, for instance, with unique requirements for urgent emergency response, is characterised by rapid turnaround and decision-making. Unlike other flight operators with scheduled flights on established routes, emergency response requires low-latency hazard assessment for rapidly changing routes and large numbers of aircraft. Thus, a need exists for a highly automated in-flight risk monitoring system.

Various embodiments of a flight management platform therefore integrate complex manual programs into one platform that is fully automated and is operable to continuously deal with the numerous combinations of weather data, flight paths, and aircraft types. Various embodiments therefore comprise geospatial/geometry analysis schema that compare proposed (e.g. filed) flight plans with the actual flight paths that are flown, monitor real-time deviation from flight plans, auto-compute a suggested "corrected" flight plan based on deviation geometry or missing plan (e.g. for FAA compliance), and maintain an audit trail. Various embodiments further include processes for adjusted time components based on flight characteristics, wind effects, waypoints, and/or ground stops.

In accordance with some embodiments, complex decision tree processes of a flight management platform mimic the weather hazard assessment thinking of a Pilot-in-Command, wherein evaluation criteria may be automated and continuously applied to a multitude of aircraft in flight along associated flight plan paths.

In accordance with various embodiments, a flight management platform may apply computed flight paths and decision tree processes to a large matrix or matrices of current and predicted geospatial weather hazard data (e.g. continuous surface maps of precipitation, wind, turbulence, shear, visibility, cloud levels, point data such as lightning, METARs, TAFs, and radar, notice-to-airmen reports, pilot reports, exclusion zones, etc.). Further, a flight management platform may process weather forecasts existing at 3, 6, 9, 12, 24 hour, and multi-day intervals, and at many different altitude levels. Despite this challenge, a flight management platform in accordance with various embodiments herein described enable determination that, for example, icing may occur at multiple levels, and/or have different effects on different airframe types (e.g. a small helicopter versus large jet).

In accordance with some embodiments, a flight management platform may comprise an advisory caution scheme with real-time themed and audible GUI components, SMS/email, and/or report-based notification, to prioritise and alert OCC personnel when a flight management process has detected aircraft entering dangerous flight path conditions. Further, various embodiments relate to a UI that minimised required on-screen interaction, while delivering low latency for corrective action support. Furthermore, and in accordance with various embodiments, a digital flight management system may comprise cost-effective hybrid data cloud architecture to ensure multi-feed data redundancy and failover, while further handling duplications and omissions from conflicting sources.

For example, various embodiments of a flight management platform relate to a time latency of approximately 50 to 160 milliseconds (e.g. when querying an asset status). This may be enabled, in accordance with various embodiments, by employing various optimisation strategies, including parallel agent processing and state-of-the art memory utilisation. In accordance with other exemplary aspects of a flight management platform, a full path hazard analysis may comprise a 5 to 10 second processing time per asset, while concurrently performing this analysis on hundreds of aircraft. Accordingly, various embodiments provide a significant improvement over the times required to perform a manual review using conventional software platforms for even a single aircraft.

While conventional platforms may perform regular database queries and calls, various embodiments of a flight management platform further comprise an analysis engine whereby multiple classes of flight plans (e.g. virtual, real, deviated, or the like) may be loaded into modifiable Redis memory caches, linked to listeners and message queues that periodically or continuously engage prioritised agent services calling decision matrices to determine a hazard status. In accordance with some embodiments, separate optimised agent services may be employed for each specialised weather/geometry/path for parallel execution, with priority managed by queue. For example, a separate agent service may be used for assessing a flight path for lightning risks, and a separate agent service for assessing a flight path in view of predicted turbulence, or for assessing icing at every flight altitude.

In accordance with various embodiments, a flight management platform may further comprise a means of minimising false alarms due to, for instance, errors in human confirmation of arrivals and departures (an FAA requirement) arriving from processes used by operators. For example, a platform may blend Air Status reports used for bookkeeping to ingest and refine determinations of aircraft that have departed or landed. Gateway processor logic may thread this data into flight objects, improving the efficiency of alert notification generation.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A digital flight management system comprising:

a digital processing environment comprising computer-executable instructions to access:

flight request data related to a flight plan;

aircraft parameter data related to an aircraft associated with said flight plan;

a flight risk data source; and geographical data corresponding to a geographical area associated with said flight plan;

wherein said computer-executable instructions are further executable to:

calculate a predicted flight path based at least in part on said flight request data and said geographical data, wherein said predicted flight path comprises multiple consecutive predicted flight path segments automatically calculated;

digitally compare, based at least in part on said aircraft parameter data, each of said predicted flight path segments with flight risk data from said flight risk data source to assess a respective flight risk associated with each of said predicted flight path segments; and via a user interface, distinctly graphically map said predicted flight path segments in accordance with said respective flight risk;

wherein said digital processing environment is operable to execute said computer-executable instructions prior to takeoff of said aircraft; and wherein said digital processing environment is operable in-flight to digitally compare each of said predicted flight path segments with said flight risk data from said flight risk data source in real-time to update each said respective flight risk associated with said predicted flight path segments in-flight; and graphically map via said user interface said predicted flight path segments in accordance with each said updated respective flight risk.

2. The digital flight management system of claim 1, wherein each of said predicted flight path segments is distinctly graphically mapped in accordance with said respective flight risk via at least one of a corresponding colour scheme, insignia or indicium.

3. The digital flight management system of claim 1, wherein said predicted flight path comprises at least an outbound and a return flight path, each one of which comprises respective said multiple flight path segments.

4. The digital flight management system of claim 1, wherein said flight risk data source comprises a weather data source.

5. The digital flight management system of claim 1, wherein said flight risk data source comprises one or more of a flight alert application programming interface (API) or notice to airman (NOTAM) alert service.

6. The digital flight management system of claim 1, wherein said aircraft comprises a plurality of respective aircrafts, and wherein said digital processing environment is operable to execute said computer-executable instructions for each of said plurality of respective aircrafts.

7. The digital flight management system of claim 1, wherein said user interface is user-configurable to display designated graphical layers associated with one or more of said predicted flight path, said flight risk data, said geographical data, or said aircraft parameter data.

8. The digital flight management system of claim 1, wherein said computer-executable instructions further comprise instructions to access aircraft location data in-flight, and calculate a flight deviation value based on said aircraft location data and said predicted flight path segments, and calculate updated flight deviated flight path segments in-flight based at least in part on said aircraft position location data, said geographical data, and said flight plan, wherein said digital processing environment is operable in-flight to digitally compare each of said deviated flight path segments with said flight risk data from said flight risk data source in real-time to associate a respective deviated flight risk with each of said deviated flight path segments in-flight; and graphically map via said user interface said deviated flight path segments in accordance with each said respective deviated flight risk.

9. The digital flight management system of claim 1, wherein said computer-executable instructions further comprise instructions to provide an alert related to an overdue aircraft based at least in part on said flight plan.

10. The digital flight management system of claim 1, wherein said predicted flight path comprises an airspace volume, and wherein said predicted flight path is compared with said flight risk data associated with locations defined within said airspace volume.

11. The digital flight management system of claim 1, wherein each of said flight path segments comprises a corresponding airspace volume, and wherein each of said flight path segments is compared with said flight risk data associated with locations defined within said corresponding airspace volume.

12. The digital flight management system of claim 11, wherein said flight path segments comprise a take-off segment defined by a take-off column associated with an area around a take-off location, a landing segment defined by a landing column associated with an area around a planned landing location, and respective flight path segment corridors defined around a planned flight altitude along said flight plan segments.

13. The digital flight management system of claim 12, wherein said take-off column and said landing column are substantially vertically oriented airspace columns, whereas said flight path segment corridors are substantially horizontally oriented airspace corridors.

14. A non-transitory computer-readable medium comprising digital instructions for execution by a digital data processor to:

digitally access:

flight request data related to a flight plan;

aircraft parameter data related to an aircraft associated with said flight plan;

a flight risk data source; and geographical data corresponding to a geographical area associated with said flight plan;

calculate a predicted flight path based at least in part on said flight request data and said geographical data, wherein said predicted flight path comprises multiple consecutive predicted flight path segments;

digitally compare, based at least in part on said aircraft parameter data, each of said predicted flight path segments with flight risk data from said flight risk data source to assess a respective flight risk associated with each of said predicted flight path segments; and via a user interface, distinctly graphically map said predicted flight path segments in accordance with said respective flight risk;

wherein said digital instructions are executable prior to takeoff of said aircraft; and wherein said digital instructions are executable in-flight to digitally compare each of said predicted flight path segments with flight risk data from said flight risk data source in real-time to update each said respective flight risk associated with said predicted flight path segments in-flight; and graphically map via said user interface said predicted flight path segments in accordance with each said updated respective flight risk.

15. The computer-readable medium of claim 14, wherein each of said predicted flight path segments are distinctly graphically mapped in accordance with said respective flight risk via at least one of a corresponding colour scheme, insignia or indicium.

16. The computer-readable medium of claim 14, wherein said digital instructions are further executable to access aircraft location data in-flight, calculate a flight deviation value based on said aircraft location data and said predicted flight path segments, calculate deviated flight path segments in-flight based at least in part on said aircraft location data, said geographical data, and said flight plan; digitally compare, in-flight, each of said deviated flight path segments with said flight risk data from said flight risk data source in real-time to associate a respective deviated flight risk with each of said deviated flight path segments in-flight; and graphically map via said user interface said deviated flight path segments in accordance with each said respective deviated flight risk.

17. The computer-readable medium of claim 14, wherein said predicted flight path segments comprise a respective airspace volume, and wherein said predicted flight path segments are compared with said flight risk data associated with locations defined within said respective airspace volume, wherein said respective airspace volume comprises a take-off column associated with an area around a take-off location, a landing column associated with an area around a planned landing location, and a flight path corridor defined around a planned flight altitude along said flight plan, wherein said take-off column and said landing column are substantially vertically oriented airspace columns, whereas said flight path corridor is a substantially horizontally oriented airspace corridor.

18. A computer-implemented digital flight management method comprising:

digitally accessing:

flight request data related to a flight plan;

aircraft parameter data related to an aircraft associated with said flight plan; a flight risk data source; and geographical data corresponding to a geographical area associated with said flight plan;

calculating a predicted flight path based at least in part on said flight request data and said geographical data, wherein said predicted flight path comprises multiple consecutive predicted flight path segments;

digitally comparing, based at least in part on said aircraft parameter data, each of said predicted flight path segments with flight risk data from said flight risk data source to assess a respective flight risk associated with each of said predicted flight path segments; and via a user interface, distinctly graphically mapping said predicted flight path segments in accordance with said respective flight risk;

wherein said calculating, digitally comparing, and graphically mapping are performed prior to takeoff of said aircraft; and further comprising, in-flight, digitally comparing each of said predicted flight path segments with flight risk data from said flight risk data source in real-time to update each said respective flight risk associated with said predicted flight path segments in-flight; and graphically mapping via said user interface said predicted flight path segments in accordance with each said updated respective flight risk.

19. The computer-implemented method of claim 18, wherein each of said predicted flight path segments are distinctly graphically mapped in accordance with said respective flight risk via at least one of a corresponding colour scheme, insignia or indicium.

20. The computer-implemented method of claim 18, wherein the method further comprises accessing aircraft location data in-flight, calculating a flight deviation value based on said aircraft location data and said predicted flight path segments; calculating deviated flight path segments in-flight based at least in part on said aircraft location data, said geographical data, and said flight plan; digitally comparing each of said deviated flight path segments with said flight risk data from said flight risk data source in real-time to associate a respective deviated flight risk with each of said updated deviated flight path segments in-flight; and graphically mapping via said user interface said deviated flight path segments in accordance with each said respective deviated flight risk.

21. The computer-implemented method of claim 18, wherein said predicted flight path segments comprise respective airspace volumes, and wherein said predicted flight path segments are compared with said flight risk data associated with locations defined within said respective airspace volumes, wherein said respective airspace volumes comprise a take-off column associated with an area around a take-off location, a landing column associated with an area around a planned landing location, and respective flight path corridors defined around a planned flight altitude along said flight plan, wherein said take-off column and said landing column are substantially vertically oriented airspace columns, whereas said respective flight path corridors are substantially horizontally oriented airspace corridors.

* * * * *